United States Patent
Tojima

(10) Patent No.: US 8,120,675 B2
(45) Date of Patent: Feb. 21, 2012

(54) MOVING IMAGE RECORDING/PLAYBACK DEVICE

(75) Inventor: Masayoshi Tojima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 602 days.

(21) Appl. No.: 11/907,692

(22) Filed: Oct. 16, 2007

(65) Prior Publication Data

US 2008/0094487 A1  Apr. 24, 2008

(30) Foreign Application Priority Data

Oct. 17, 2006  (JP) .................................. 2006-282411

(51) Int. Cl.
  *H04N 5/92*  (2006.01)
(52) U.S. Cl. .......................... 348/239; 386/328; 386/326
(58) Field of Classification Search .......................... None
  See application file for complete search history.

(56) References Cited

U.S. PATENT DOCUMENTS

| | | | |
|---|---|---|---|
| 5,710,590 A | | 1/1998 | Ichige et al. |
| 6,289,164 B1 * | | 9/2001 | Hori et al. ........................ 386/46 |
| 7,620,483 B2 * | | 11/2009 | Florentin et al. .................... 701/2 |
| 2005/0190274 A1 | | 9/2005 | Yoshikawa et al. |
| 2005/0212913 A1 * | | 9/2005 | Richter .......................... 348/170 |
| 2006/0028564 A1 * | | 2/2006 | Baer .............................. 348/294 |

FOREIGN PATENT DOCUMENTS

| | | |
|---|---|---|
| JP | 7-288789 | 10/1995 |
| JP | 2005-167925 | 6/2005 |
| JP | 2005-244760 | 9/2005 |
| JP | 2005-244761 | 9/2005 |
| JP | 2005-266373 | 9/2005 |

* cited by examiner

*Primary Examiner* — David Ometz
*Assistant Examiner* — Angel L Garces-Rivera
(74) *Attorney, Agent, or Firm* — Wenderoth Lind & Ponack, L.L.P.

(57) ABSTRACT

A moving image recording/playback device records a moving image of a subject. In the case of recording, the moving image recording/playback device sequentially outputs a plurality of image frames that constitute the moving image at a predetermined frame rate and, for the plurality of image frames, records whole image frames at intervals of a predetermined number of frames and partly records other image frames, onto at least one recording medium. In the case of playback, when reading a partly recorded image frame, the moving image recording/playback device generates a display frame from the partly recorded image frame and a recorded whole image frame.

14 Claims, 17 Drawing Sheets

MOVING IMAGE RECORDING/PLAYBACK DEVICE

BACKGROUND OF THE INVENTION

1. Field of the Invention

The present invention relates to high-speed photography using a high-speed camera, and especially relates to a technique for improving recording performance and enhancing user convenience at the time of playback.

2. Related Art

In recent years, data amounts of moving images have become larger to meet demand for higher picture quality. Particularly in the case of high-speed photography, a large amount of data needs to be recorded because of a high frame rate.

In view of this, techniques for reducing data amounts of moving images have been developed in consideration of processes such as recording the moving images onto recording media.

One of these techniques is a compression coding technique such as MPEG (Motion Picture Experts Group). This technique is devised to record one screen of data constituting a moving image, in a reduced data amount.

Also, a technique of reducing a size of a screen to be recorded so as to make a data amount smaller has been developed, too.

One example is a technique relating to a surveillance camera system that can reduce an amount of image accumulated when an abnormal condition is detected (see Patent Document 1).

This technique sets, within a screen for photographing a surveillance area (e.g. a screen 20 in FIG. 16), an area (e.g. an area A to an area D in FIG. 16) smaller than the screen in advance and, when a movement is detected in that area, records only the area in which the movement is detected. This will be explained in more detail later, with reference to FIG. 17.

According to this technique, by recording image data of a part that includes a movement, an amount of data can be reduced while realizing a function as a surveillance camera.
Patent Document 1: Japanese Patent Application Publication No. 2005-266373.

SUMMARY OF THE INVENTION

However, though this technique certainly enables to reduce recorded moving image data in size, a playback screen is updated only in a recorded area, e.g. a display area of the area A, and an object or the like that goes out of this area cannot be shown on the playback screen.

Also, due to the nature of the surveillance camera, the surveillance area, i.e. a photographing screen, is fixed. Therefore, this technique is not suitable for data reductions of general video cameras and the like that record a moving image without fixing a photographing screen.

Hence the present invention aims to provide a moving image recording device and a moving image playback device that can record and play a moving image in a reduced data amount.

The stated aim can be achieved by a moving image recording device that records a moving image of a subject, the moving image recording device including: an imaging unit operable to sequentially output a plurality of image frames that constitute the moving image, at a predetermined frame rate; and a recording unit operable to, of the plurality of image frames output from the imaging unit, wholly record image frames at intervals of a predetermined number of frames and partly record each of other image frames, onto at least one recording medium.

The subject referred to here is something captured by a video camera or the like, such as a person, a thing, or a scene that is subject to photography.

According to the above structure, when recording the plurality of image frames obtained by photographing the moving image, some of the plurality of image frames are recorded partially, not wholly. As a result, an amount of recorded data of the moving image can be reduced.

Since only partial images are recorded for particular frames, a time period required for a coding process can be shortened when performing compression coding. Also, a storage amount of a frame memory for accumulating input images prior to the coding process can be reduced.

Accordingly, high-speed frame photography in which an input image has a higher frame rate than a coding speed can be performed over a long period of time.

Thus, both a high resolution and a memory reduction can be achieved with a low-cost device even in the case where a photographed image is input at a higher frame rate than a coding process or an accumulation process.

Here, a recorded part of each of the other image frames may contain a specific part of the subject.

According to the above structure, the recorded part includes the specific part of the subject. This means the specific part of the subject is included in all recorded frames. Thus, the specific part of the subject can be recorded without fail.

Here, the moving image recording device may further include: a coding unit operable to code image frames, wherein in a case of partly recording an image frame, the coding unit codes the image frame which is output from the imaging unit and then filled with one predetermined color except a part to be recorded, and the recording unit records the coded image frame.

According to the above structure, each of the particular image frames is recorded as an image frame of a single color except its part that is to be recorded. As a result, an amount of coded data can be reduced while recording the specific part, when compared with the case of coding an entire photographed image frame.

Also, since all recorded frames have a same size, the moving image can be played by a conventional playback device.

Here, the moving image recording device may further include: a generation unit operable to generate display frames to be displayed, from image frames recorded on the recording medium, wherein in a case of performing display, the generation unit sequentially reads a plurality of image frames that are composed of the wholly recorded image frames and the partly recorded image frames from the recording medium, and generates a plurality of display frames from the read plurality of image frames, and when reading a partly recorded image frame, the generation unit generates a display frame from the partly recorded image frame and a wholly recorded image frame.

According to the above structure, other parts of each partly recorded image frame can be supplemented using another image frame. As a result, the moving image can be played without a loss of information on a display screen.

For example, when the photographed moving image is played, though the specific part appears to be played at the frame rate of the photographing, the remaining parts appear to be played at a lower frame rate than the frame rate of the photographing. More specifically, when a moving image photographed at a frame rate of 180 fps (frames per second) is played at the frame rate of 180 fps, it means that the moving image is played at 1 time speed. In this case, the specific part appears to be played more smoothly than the remaining parts.

Also, when a moving image photographed at a frame rate of 180 fps is played at the frame rate of 30 fps, it means that the moving image is played at ⅙ times speed, namely more slowly than the original speed. Even in this case, the specific part appears to be played more smoothly than the remaining parts.

That is, when playing an image of a high frame rate photographed at a high speed, a moving image of a high resolution can be generated from partial images clipped while maintaining the high resolution and wholly recorded images of the high resolution inserted at regular intervals before and after the partial images. Accordingly, in playback of a high-speed photographed image, all frames can be played at a high resolution with information surrounding the specific part being included too, without a loss of information of the subject.

Here, the recording unit may partly record the image frame onto the recording medium in correspondence with information showing a position of a recorded part in the image frame, wherein when reading the partly recorded image frame, the generation unit generates the display frame in which the recorded part is reflected at the position shown by the information.

According to the above structure, the position of the recorded part of the image frame can be obtained easily. This facilitates an operation of combining the recorded part with a wholly recorded image frame.

Here, the generation unit may further sequentially read only the wholly recorded image frames from the recording medium and generate display frames from the wholly recorded image frames.

According to the above structure, it is possible to play only the wholly recorded image frames. Hence the moving image can be played at a lower frame rate than the predetermined frame rate.

The stated aim can also be achieved by a moving image playback device that plays a photographed image recorded on at least one recording medium, the photographed image being composed of a plurality of image frames that are photographed at a predetermined frame rate and are made up of a first group of image frames and a second group of image frames, a size of each image frame of the first group being smaller than a size of each image frame of the second group, the moving image playback device including: a reading unit operable to read an image frame of the photographed image from the recording medium; and a generation unit operable to generate a display frame from the image frame read by the reading unit, wherein the reading unit sequentially reads image frames from the recording medium and has the generation unit generate display frames from the read image frames, and when a read image frame is an image frame of the first group, the generation unit generates a display frame from the image frame of the first group and an image frame of the second group.

According to the above structure, even when the recorded image frames include a smaller image frame, a display image can be generated from the smaller image frame with reference to another larger image frame. Since a surrounding area of the smaller image frame can be supplemented in this way, it is possible to perform the playback without a loss of information on a playback screen.

Here, the reading unit may sequentially read only the image frames of the second group and have the generation unit generate display frames from the read image frames of the second group.

According to the above structure, it is possible to play only larger image frames. This can provide a skipping playback where the image is played at a lower frame rate than the predetermined frame rate being the frame rate of the photographing.

Here, each image frame recorded on the recording medium may have time stamp information showing a display timing, wherein the first group of image frames and the second group of image frames are recorded in separate consecutive areas, and in a case of performing playback, the reading unit sequentially reads the image frames and has the generation unit generate the display frames from the read image frames, based on the time stamp information.

Here, each image frame recorded on the recording medium may have time stamp information showing a display timing, wherein the first group of image frames and the second group of image frames are recorded on separate recording media, and in a case of performing playback, the reading unit sequentially reads the image frames and has the generation unit generate the display frames from the read image frames, based on the time stamp information.

According to the above structure, even when larger image frames and smaller image frames are recorded separately, a display timing of each frame is available so that each frame can be played in a correct order.

Also, since the larger image frames are recorded in a consecutive area separately from the smaller image frames, the skipping playback can be easily performed at the lower frame rate than the predetermined frame rate.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 2 shows an example of image frames recorded by a general video recorder or the like;

DESCRIPTION OF REFERENCE NUMERALS

1000 . . . moving image recording/playback device
1100, 4100, 5100 . . . image input unit
1110, 4110, 5110 . . . camera unit
1200 . . . subject locking unit
1300, 4200 . . . specific part position detection unit
1400, 4400 . . . recording frame generation unit
1500 . . . image compression unit
1600, 2500 . . . frame memory
1700 . . . recording control unit
2000 . . . moving image recording device
2100 . . . image display unit
2110 . . . display
2200 . . . display frame generation unit
2300 . . . playback frame rate storage unit
2400 . . . image decompression unit
2600 . . . playback control unit
3000 . . . recording medium

DETAILED DESCRIPTION OF THE INVENTION

First Embodiment

Overview

The present invention takes into consideration that there are two cases when photographing a moving image: the user wants to record a whole screen; and the user wants to record with a focus on a specific part of a subject.

Of these cases, the present invention aims to reduce data in the case where the user wants to record a specific part of a subject.

In the case where the user wants to record a specific part of a subject, it is sufficient if only a partial image including the specific part can be played at a desired frame rate.

On example is high-speed photography of a thrown ball. In this case, only the ball that is rotating needs to be played at a high frame rate while a background does not need to be played at a high frame rate. Here, the subject is a scene that is subject to photography, and the specific part is the ball.

A moving image recording/playback device according to a first embodiment of the present invention records, of image frames photographed at a designated frame rate, whole image frames at intervals of a predetermined number of frames and, for the rest of image frames, partial images including a specific part.

This enables image data of the specific part to be recorded at the designated frame rate. As a result, when performing playback, a screen is updated at the designated frame rate with regard to the specific part. Also, since the whole image frames are recorded at the intervals of the predetermined number of frames, the screen as a whole is updated, too.

Figure 2:
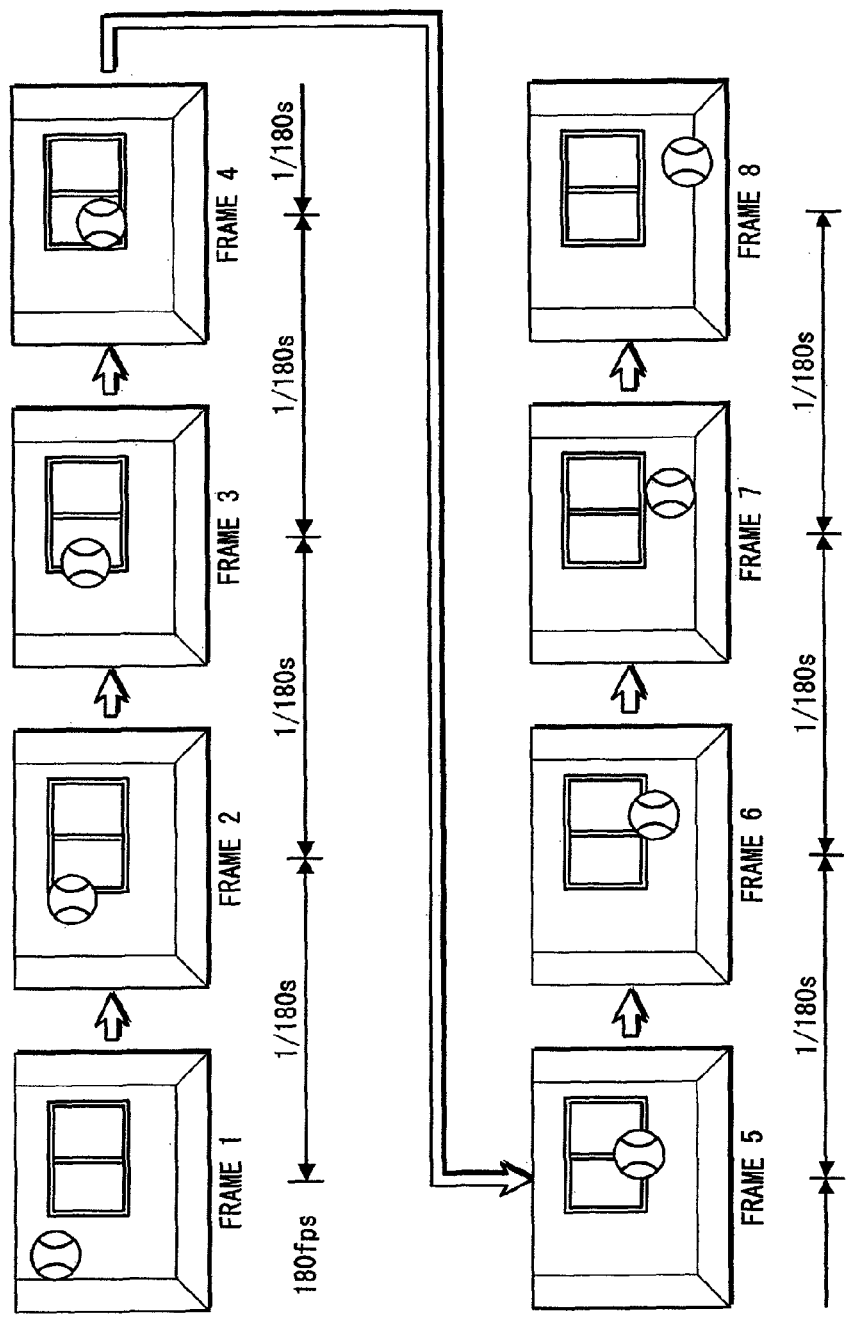
Figure 3:
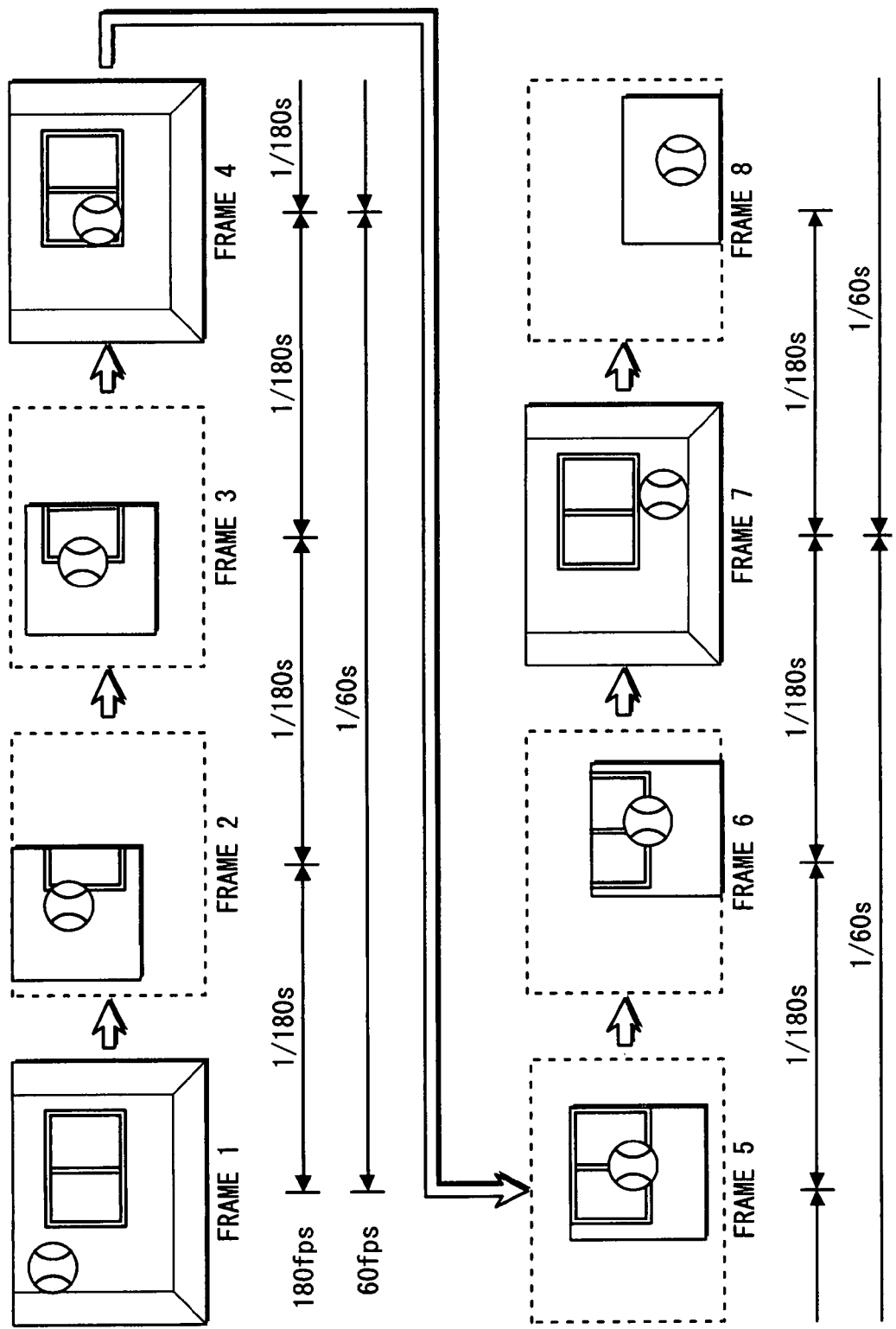
FIG. 3 shows an example of image frames recorded by the moving image recording/playback device according to the first embodiment, in the case of recording the same moving image as in FIG. 2.
Figure 4:
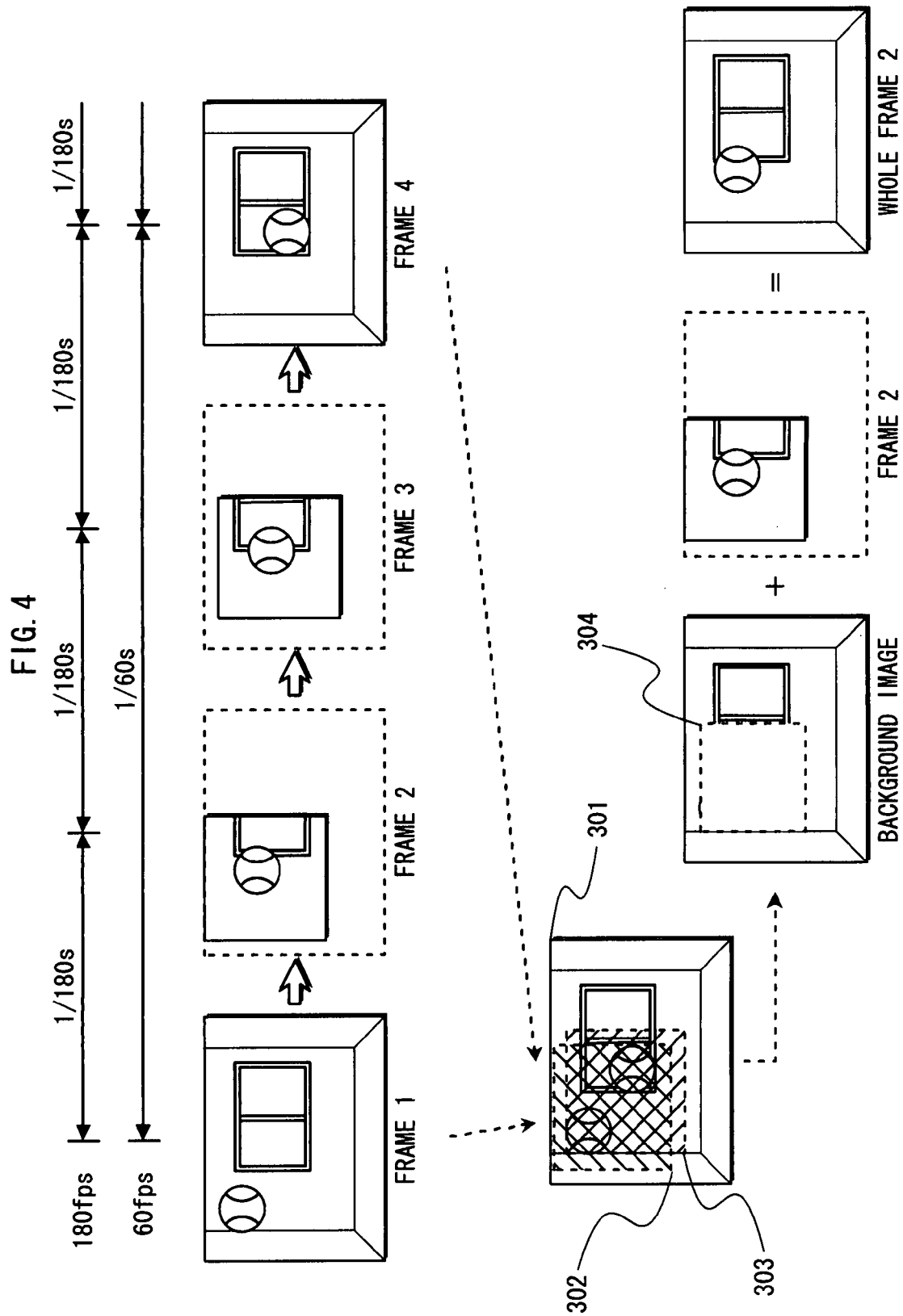
FIG. 4 shows a procedure when playing frame 2.

Prior to describing a structure of the moving image recording/playback device according to this embodiment, the following describes image frames recorded by the moving image recording/playback device, with reference to FIGS. 2 to 4.

Note that a frame, a partial image, a ball, and the like in FIG. 2 and other drawings are not accurately shown in actual sizes, for ease of explanation and understanding. Also, a relation between a frame rate and a ball position shown in the drawings does not represent an actual movement of a thrown ball, for ease of explanation and understanding.

<Image Frames Recorded by the Moving Image Recording/Playback Device>

FIG. 2 shows an example of image frames recorded by a general video recorder or the like.

FIG. 2 shows frame 1 to frame 8 as a result of photographing a thrown ball at a frame rate of 180 fps. These image frames are recorded.

FIG. 3 shows an example of image frames recorded by the moving image recording/playback device according to this embodiment, for the same moving image as in FIG. 2. In FIG. 3, a photographed image frame is indicated by a rectangle in dotted lines, whereas a recorded partial image of the photographed image frame is indicated by a rectangle in solid lines.

The moving image recording/playback device according to this embodiment wholly records image frames corresponding to a frame rate of 60 fps and, for the other image frames, records only partial images that include the ball.

In detail, only frame 1, frame 4, and frame 7 are recorded in a normal frame size and, for the other image frames, parts including the ball are recorded as image frames.

The following describes how to play such a partial image frame including the ball, with reference to FIG. 4.

FIG. 4 shows a procedure of playing frame 2.

Frame 1 and frame 4 are combined to generate a background image. Further, a recorded part of frame 2 is combined with the background image so as to reflect frame 2 on the background image. As a result, whole frame 2 is generated.

The background image is generated by weighting the frames based on their frame timing positions. For instance, a weighted average is calculated for luminance values of pixels of a frame. In the case of frame 2, as one example, the images are combined with a weight of "2" being assigned to frame 1 and a weight of "1" to frame 4.

Following this, the partial image is inserted in the background image in accordance with position information of the partial image. As a result, frame 2 is generated. Frame 3 can be generated in the same way as frame 2. When doing so, a background image of frame 3 may be generated using a different weighting ratio from frame 2, or the background image of frame 2 may be used as a background image of frame 3.

As a result, in playback of a moving image photographed at a high speed, continuous frame images can be played without a decrease in image quality of an attention area, and with a minimums loss of information by interpolating an image surrounding the attention area using preceding and succeeding frames.

Here, a size of the partial image of frame 2 or frame 3 is set so as to conceal the ball in each of frame 1 and frame 4. In FIG. 4, a rectangle 302 indicates frame 2, and a rectangle 303 indicates frame 3 (see frame 301 in FIG. 4).

This partial image size is determined in view of a frame rate and factors regarding a subject that needs to be photographed at a high speed, e.g. a speed of the ball, a moving distance of the ball on the screen, and the like.

In FIG. 4, an image excluding pixel data of a rectangle 304 where the rectangle 302 and the rectangle 303 overlap with each other is set as a background image, in order to allow the same background image to be used when generating frame 2 and frame 3.

The following describes the moving image recording/playback device according to this embodiment. The moving image recording/playback device can play a moving image, which was photographed at the frame rate 180 fps, at the frame rate of 180 fps or at the frame rate of 60 fps by skipping frames, and record the photographed moving image after coding it according to H.264. Here, a frame size is 1920×1080 (pixels) and a partial image size is 1280×720 (pixels) that is about ½ of the frame size.

<Structure>

Figure 1:
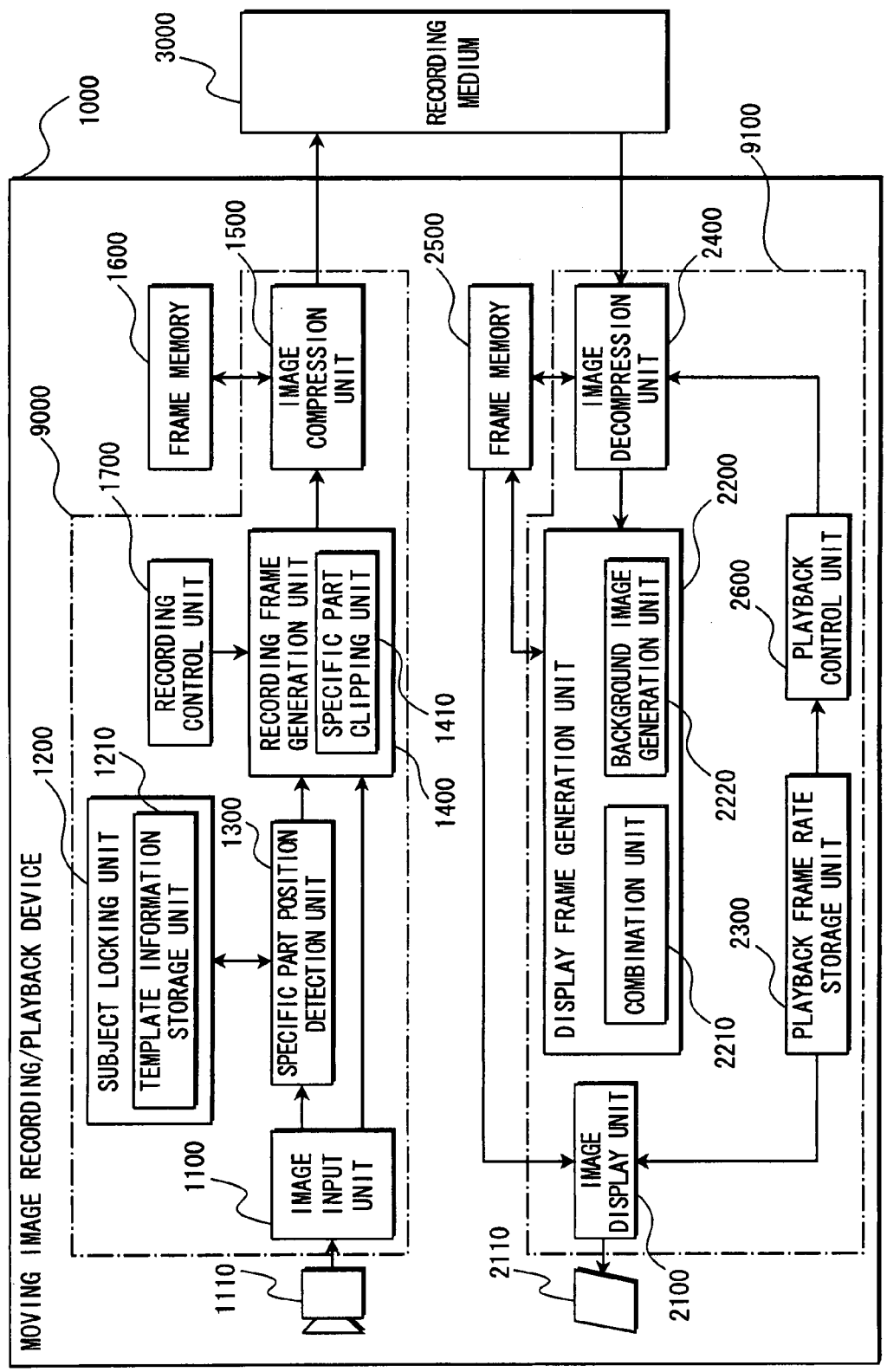
FIG. 1 is a functional block diagram showing a structure of a moving image recording/playback device according to a first embodiment of the present invention.

The following describes functions of the moving image recording/playback device according to this embodiment, with reference to FIG. 1.

FIG. 1 is a functional block diagram showing the structure of the moving image recording/playback device.

A moving image recording/playback device 1000 has a function of photographing a moving image, as with a general video recorder. Here, data of an image signal obtained as a result of the photography is recorded onto a recording medium 3000 such as a memory card.

Though this embodiment describes the case where the recording medium 3000 is removable from the moving image recording/playback device, the recording medium 3000 may instead be a storage area within the moving image recording/playback device.

The moving image recording/playback device 1000 includes a camera unit 1110, an image input unit 1100, a subject locking unit 1200, a specific part position detection unit 1300, a recording frame generation unit 1400, an image compression unit 1500, a frame memory 1600, a recording control unit 1700, a display 2110, an image display unit 2100, a display frame generation unit 2200, a playback frame rate storage unit 2300, an image decompression unit 2400, a frame memory 2500, and a playback control unit 2600.

The moving image recording/playback device 1000 mainly has two functions, that is, a function of recording a moving image and a function of playing a moving image.

<Function of Recording a Moving Image>

Functional units for realizing the function of recording a moving image are described first.

The camera unit 1110 includes a lens, a CCD (Charge Coupled Device), and the like. The CCD has a function of converting light reflected from a photographing target and gathered by the lens to an electric signal, and outputting the electric signal to the image input unit 1100. When doing so, the CCD converts the reflected light to the electric signal in accordance with a designated imaging frame rate.

The image input unit 1100 converts the signal received from the camera unit 1110 to a digital signal, applies various signal processing to the digital signal to generate an image frame (hereafter referred to as an "input frame"), and outputs the input frame.

The subject locking unit 1200 has a function of storing information for detecting a specific part of a subject which the user wants to record. For example, if the user wants a ball to be the specific part, the subject locking unit 1200 stores information of an image of the ball. In detail, before high-speed photography starts, to generate a template of the specific part of the subject which the user mainly wants to photograph, the subject locking unit 1200 recognizes the specific part, extracts edge information of the specific part, and sets the extracted information as specific part template information.

This specific part template information is stored in a template information storage unit 1210 in the subject locking unit 2100.

The specific part position detection unit 1300 has a function of detecting a position of the specific part in the input frame that is output from the image input unit 1100, after the photography starts.

In more detail, the specific part position detection unit 1300 detects the specific part from the input frame using the specific part template information stored in the template information storage unit 1210, and calculates the position of the specific part in the input frame. The specific part position detection unit 1300 outputs information about the calculated position (hereafter referred to as "specific part position information") to the recording frame generation unit 1400.

Further, the specific part position detection unit 1300 extracts updated edge information from the detected specific part, and stores the extracted edge information into the template information storage unit 1210 as updated specific part template information. This updated specific part template information will be used for recognizing the specific part in a next input frame.

The recording frame generation unit 1400 has a function of generating an image to be recorded. The image generated here can be classified into two types: the input frame itself that is output from the image input unit 1100 (hereafter referred to as a "whole frame"); and a part of the input frame (hereafter referred to as a "partial frame"). Which one of these recording frames is to be generated is specified by the recording control unit 1700.

The recording frame generation unit 1400 includes a specific part clipping unit 1410. The specific part clipping unit 1410 has a function of clipping the specific part from the input frame and generating a partial frame.

The partial frame clipped here is an image clipped in accordance with the detected specific part position information so as to include the specific part, and is smaller than the input frame. In this embodiment, a size of the input frame and the whole frame is 1920×1080 (pixels), and a size of the partial frame is 1280×720 (pixels) that is about ½ of the input frame and the whole frame.

The recording frame generation unit 1400 outputs the generated whole frame or partial frame to the image compression unit 1500. When doing so, the recording frame generation unit 1400 also outputs information showing whether the generated recording frame is the whole frame or the partial frame and, in the case of the partial frame, information showing a position of the partial frame in the input frame.

For instance, the recording frame generation unit 1400 outputs header information which includes a flag showing whether the generated recording frame is the whole frame or the partial frame and position information of the partial frame, together with the generated recording frame.

The image compression unit 1500 has a function of compression-coding the recording frame received from the recording frame generation unit 1400 and outputting the compression-coded recording frame to the recording medium 3000. When doing so, the image compression unit 1500 also outputs header information regarding such as whether the recording frame is the whole frame or the partial frame, to the recording medium 3000. The compression coding will be described in detail later, with reference to FIGS. 5 to 9.

The frame memory 1600 is a memory used when the image compression unit 1500 performs the coding process, and has such a function as accumulating pixel data in units of frames for use as a reference image.

The recording control unit 1700 has a function of instructing the recording frame generation unit 1400 regarding whether the whole frame or the partial frame is to be generated from the input frame.

For example, when the imaging frame rate is 180 fps, the recording control unit 1700 instructs the recording frame generation unit 1400 to generate partial frames from two consecutive input frames, and generate a whole frame from an input frame that follows the two consecutive input frames. That is, the recording control unit 1700 instructs the recording frame generation unit 1400 to generate a whole frame for every three input frames. As a result, whole frames are generated from input frames that correspond to the frame rate of 60 fps, and partial frames are generated from the other input frames (see FIG. 3).

<Function of Playing a Moving Image>

Functional units for realizing the function of playing a moving image are described next.

The playback frame rate storage unit 2300 has a function of storing a playback frame rate. In this embodiment, a moving image photographed at 180 fps can be played at either 180 fps or 60 fps. Accordingly, the playback frame rate storage unit 2300 stores information showing either 180 fps or 60 fps.

The playback control unit 2600 references the playback frame rate storage unit 2300 and notifies the image decompression unit 2400 which recording frame is to be decoded. In the case of 180 fps, the playback control unit 2600 instructs the image decompression unit 2400 to decode both the whole frames and the partial frames. In the case of 60 fps, the playback control unit 2600 instructs the image decompression unit 2400 to decode only the whole frames.

The image decompression unit 2400 has a function of reading compression-coded moving image data from the recording medium 3000 and decoding the read moving image data. The image decompression unit 2400 decodes only the whole frames or both the whole frames and the partial frames, based on the notification from the playback control unit 2600.

Also, the image decompression unit 2400 has a function of storing the decoded whole frames and partial frames to the frame memory 2500 and, in the case of a partial frame, outputting the decoded partial frame to the display frame generation unit 2200.

When outputting the decoded partial frame to the display frame generation unit 2200, the image decompression unit 2400 also outputs header information of the partial frame.

The frame memory 2500 is used when the image decompression unit 2400 performs the decoding process, and has a function of accumulating pixel data of a partial frame, pixel data for use as a reference image or the like, and so on. A whole frame accumulated by the image decompression unit 2400 is used as a frame for display.

The display frame generation unit 2200 has a function of generating an image frame for display (hereafter referred to as a "display frame") from the partial frame received from the image decompression unit 2400, and storing the display frame to the frame memory 2500. A size of the display frame is the same as that of the input frame.

In more detail, upon receiving the partial frame, the display frame generation unit 2200 generates the display frame by adding a background to the partial frame, and stores the display frame to the frame memory 2500. Meanwhile, a display frame corresponding to the whole frame is accumulated in the frame memory 2500 by the image decompression unit 2400.

The display frame generation unit 2200 includes a combination unit 2210 and a background image generation unit 2220, and generates the display frame from the partial frame using these functional units.

The background image generation unit 2220 generates a background image from whole frames of a high resolution preceding and succeeding the partial frame.

The combination unit 2210 combines the partial frame with the background image of the display frame size. In detail, the combination unit 2210 generates the display frame in which the background image generated by the background image generation unit 2220 is used in an area other than the partial frame and an image of the partial frame itself is put in an area of the partial frame (see FIG. 4).

The image display unit 2100 reads the display frame from the frame memory 2500, generates an image signal at the playback frame rate, and displays the image signal on the display 2110.

It should be noted that the functional block diagram of FIG. 1 only shows the functional units that directly relate to this embodiment, and a function of a general camera recorder such as a user interface for setting an imaging frame rate and the like has been omitted.

<Compression Coding>

The following describes the compression coding of image data recorded in the moving image recording/playback device 1000 in detail, with reference to FIGS. 5 to 9.

Figure 5:
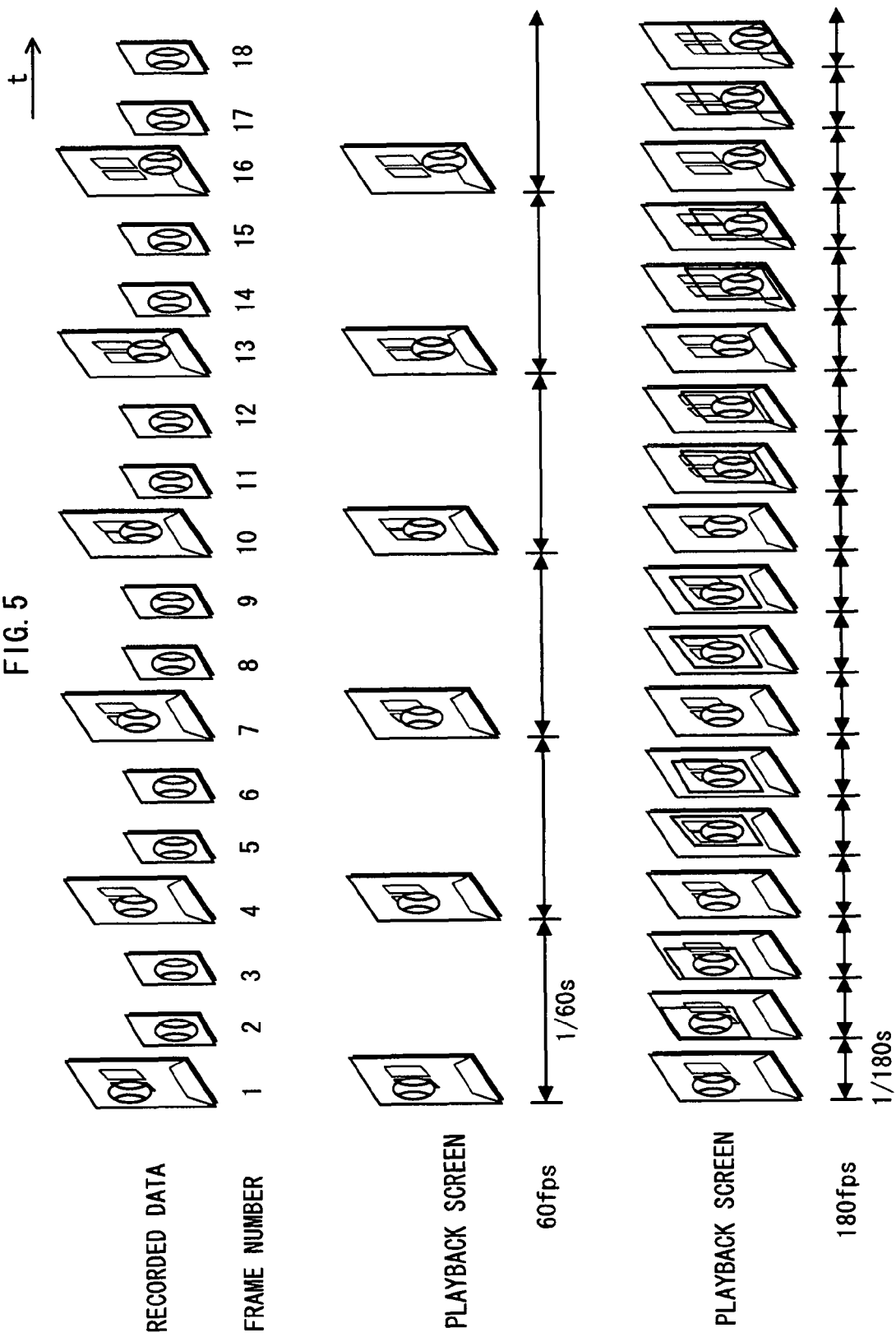
FIG. 5 shows image frames played at 180 fps and image frames played at 60 fps.

FIG. 5 shows image frames played at 180 fps and image frames played at 60 fps.

The moving image recording/playback device 1000 is capable of playing a moving, image, which was photographed at the frame rate of 180 fps, at the frame rate of 180 fps or 60 fps.

To facilitate such playback, the coding process needs to be performed.

In FIG. 5, recorded data shown in an upper tier is data of a moving image recorded at the frame rate of 180 fps. Both whole frames and partial frames are included in this recorded data.

In the case of playing the recorded data at the frame rate of 60 fps, only the whole frames are displayed as shown in a middle tier in FIG. 5.

In the case of playing the recorded data at the frame rate of 180 fps, display frames of the same size as the whole frame size are generated from the partial frames and the whole frames and the generated display frames are displayed as shown in a lower tier in FIG. 5.

Figure 6:
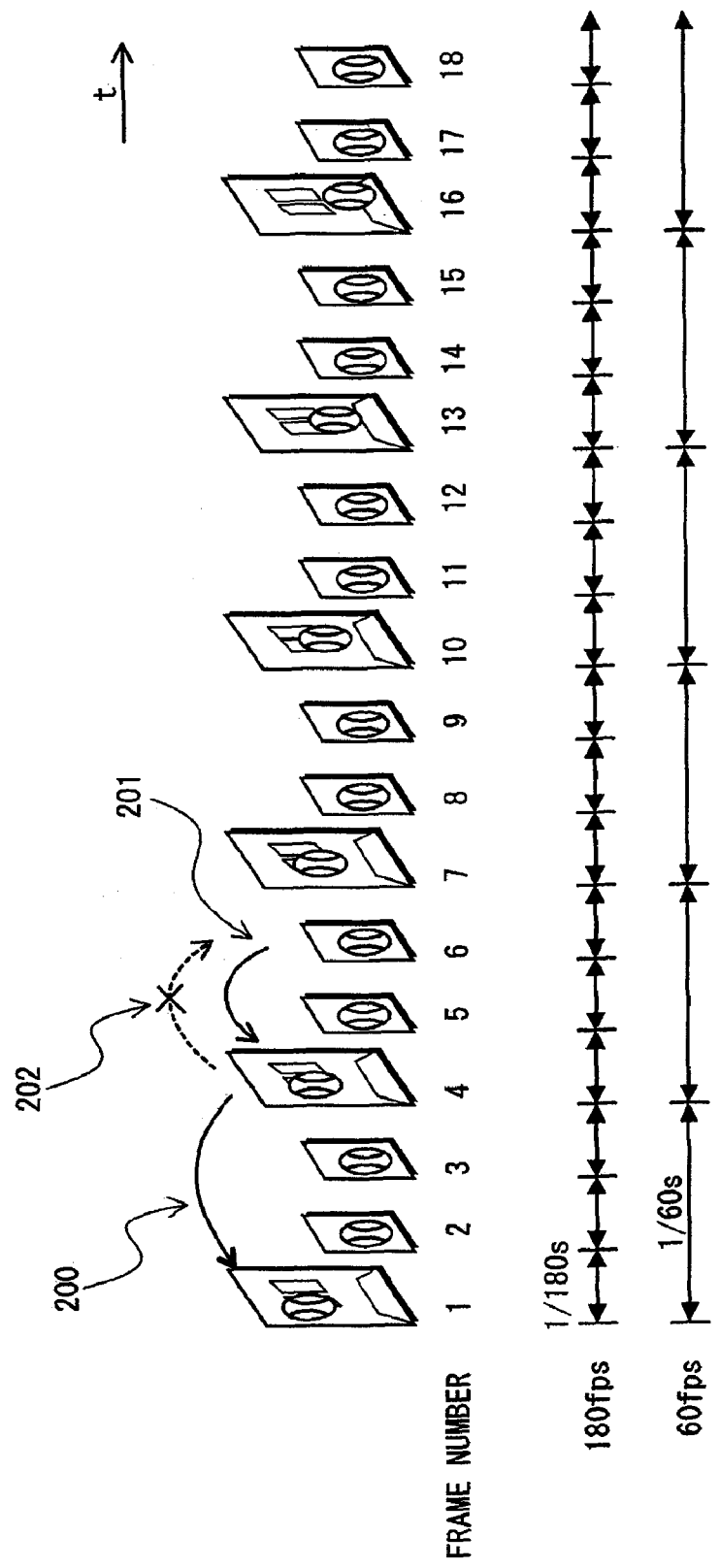
FIG. 6 shows reference relations between recorded frames.

FIG. 6 shows reference relations between recording frames.

In FIG. 6, each arrow indicates a reference direction of a frame. As one example, frame 4 references frame 1 (see arrow 200).

When the moving image recording/playback device 1000, performs playback at 60 fps, only the whole frames are necessary as shown in FIG. 5. This being so, frames to be referenced need be limited to whole frames. Which is to say, there is a precondition that a whole frame cannot reference a partial frame.

Meanwhile, a partial frame can reference a whole frame. This is because the whole frames are definitely decoded when decoding the partial frames.

For example, frame 4 cannot reference frame 6 (see arrow 202) but frame 6 can reference frame 4 (see arrow 201).

Since the whole frames having the timings of $\frac{1}{60}$ second and the partial frames having the timings of $\frac{1}{180}$ second have different motion detection targets, in the coding process it is preferable to code the whole frames and the partial frames as separate sequences. That is, in the case of the whole frames, motion compensation is performed solely on the whole frames, whereas in the case of the partial frames, motion compensation is performed on both the whole frames and the partial frames.

Also, though a partial frame can reference another partial frame, in this embodiment each partial frame is recorded as a non-referenced picture.

Figure 7:
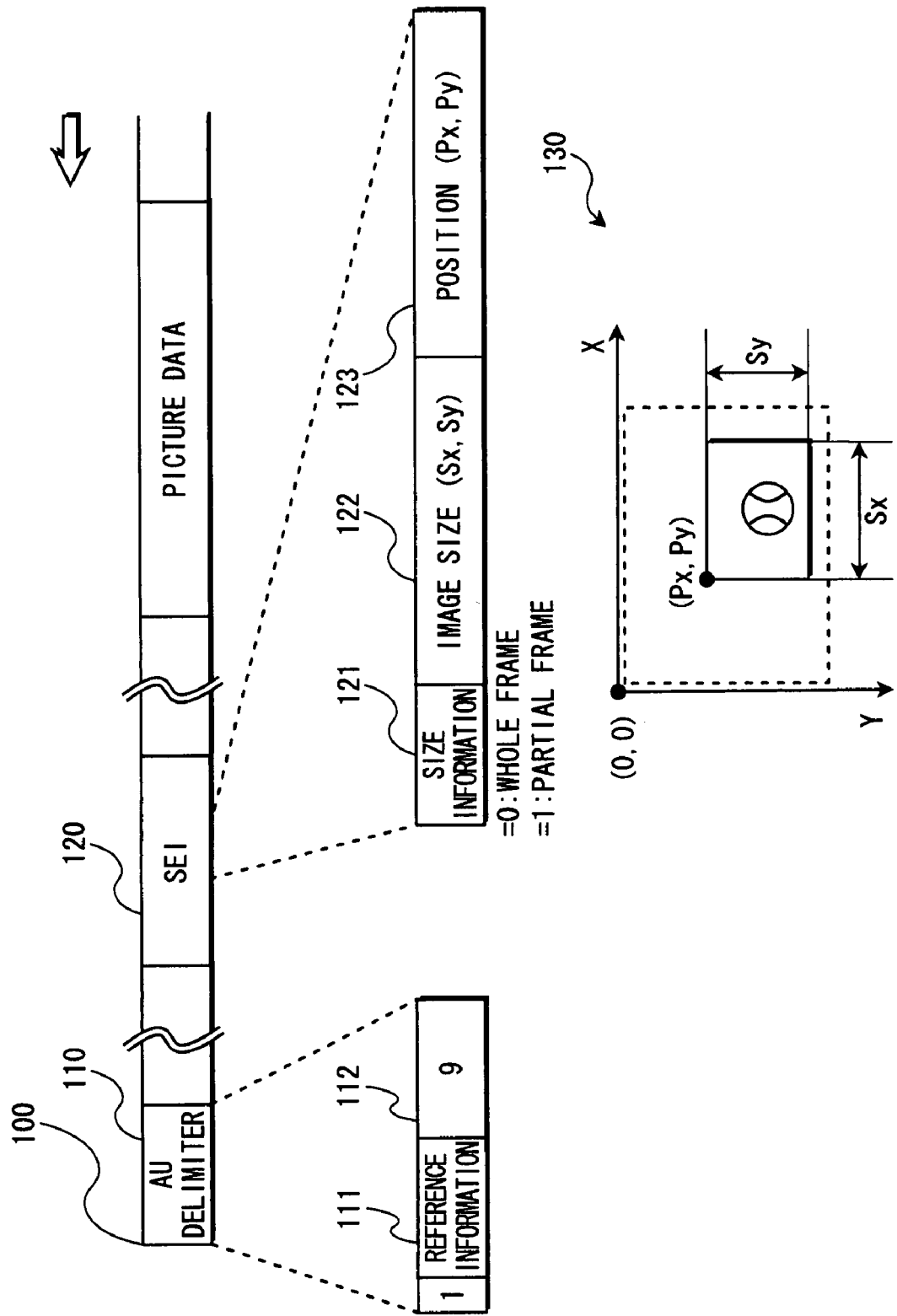
FIG. 7 shows an example structure of an access unit.

FIG. 7 shows an example structure of an access unit.

A bit stream of a compressed image is composed of a plurality of NAL (Network Abstraction Layer) units. To perform access in units of pictures, a series of NAL units is grouped as an access unit.

An access unit 100 which is a bit stream of a compressed image frame according to this embodiment is described below as one example.

The access unit 100 is composed of an AU delimiter 110 indicating a beginning of the access unit 100, and SEI (Supplemental Enhancement Information) 120 as supplemental additional information, picture data, and the like that follow the AU delimiter 110.

The AU delimiter 110 includes reference information 111 indicating whether the image frame is a referenced picture, and a value "9" indicating that the present NAL unit is a NAL unit for an AU delimiter.

In the case of a partial frame, the reference information 111 is set to indicate that the image frame is a non-referenced picture. In the case of a whole frame, the reference information 111 is set depending on the whole frame.

The SEI 120 includes size information 121, an image size 122, and a position 123.

The size information 121 indicates whether the access unit 100 is data of a whole frame or data of a partial frame. The size information 121 is set to "0" in the case of a whole frame, and "1" in the case of a partial frame.

The image size 122 is a size of the frame. In this embodiment, the partial frame size is fixed. In the case of a whole frame, (Sx, Sy) is set to (1920, 1080). In the case of a partial frame, (Sx, Sy) is set to (1280, 720).

The position 123 is information showing a position of a partial frame in an input frame. In the case of a whole frame, (Px, Py) is set to (0, 0). In the case of a partial frame, (Px, Py) is set in the following manner.

In a coordinate system 130, an upper left point of an input frame (a rectangle in dotted lines) is set to (0, 0), and an upper left point of a partial frame (a rectangle in solid lines) is designated by the coordinates (Px, Py).

Note that the image size 122 and the position 123 may be used as meaningful information only in the case of a partial frame. This is because, in the case of a whole frame, (Sx, Sy) is always set to (1920, 1080), and (Px, Py) is always set to (0, 0).

Figure 8:
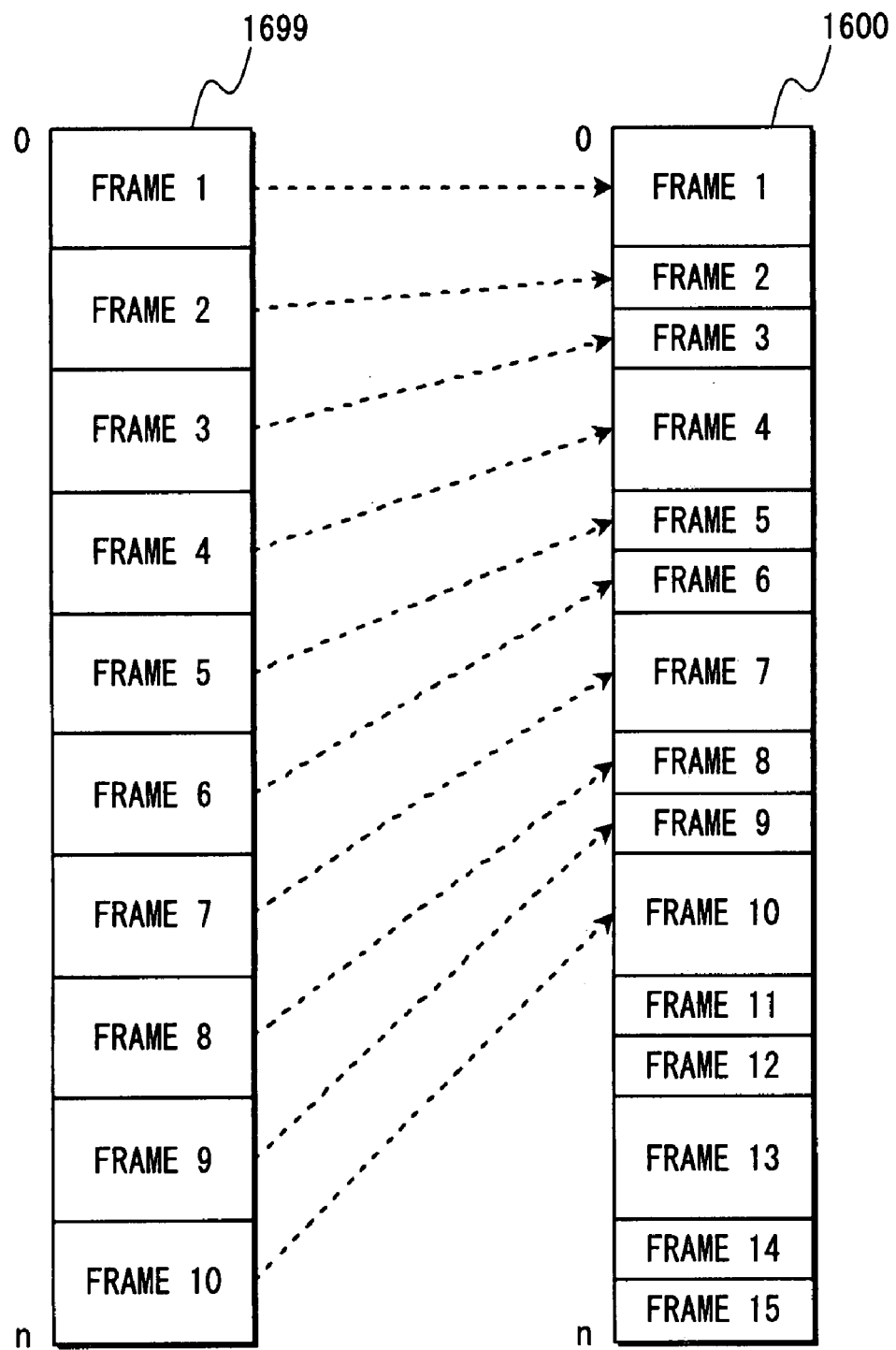
FIG. 8 shows a frame memory that stores image frames as a result of a coding process according to the first embodiment.

FIG. 8 shows a frame memory in which image frames are stored as a result of the coding process according to this embodiment.

A frame memory 1699 is an example of storing pixel data of image frames in sequence, when coding image frames photographed by a general video camera (see FIG. 2). A frame memory 1600 is an example of storing pixel data of image frames in sequence, when coding image frames photographed by the moving image recording/playback device according to this embodiment (see FIG. 3).

In this embodiment, a whole frame is 1920×1080 (pixels) and a partial frame is 1280×720 (pixels) that is about ½ of the whole frame. Accordingly, the efficiency of the frame memory can be increased by about 1.5 times according to this embodiment.

In this embodiment, for example, frame 1 to frame can be stored in an area in which frame 1 to frame 7 are stored in the case of the frame memory 1699.

Figure 9:
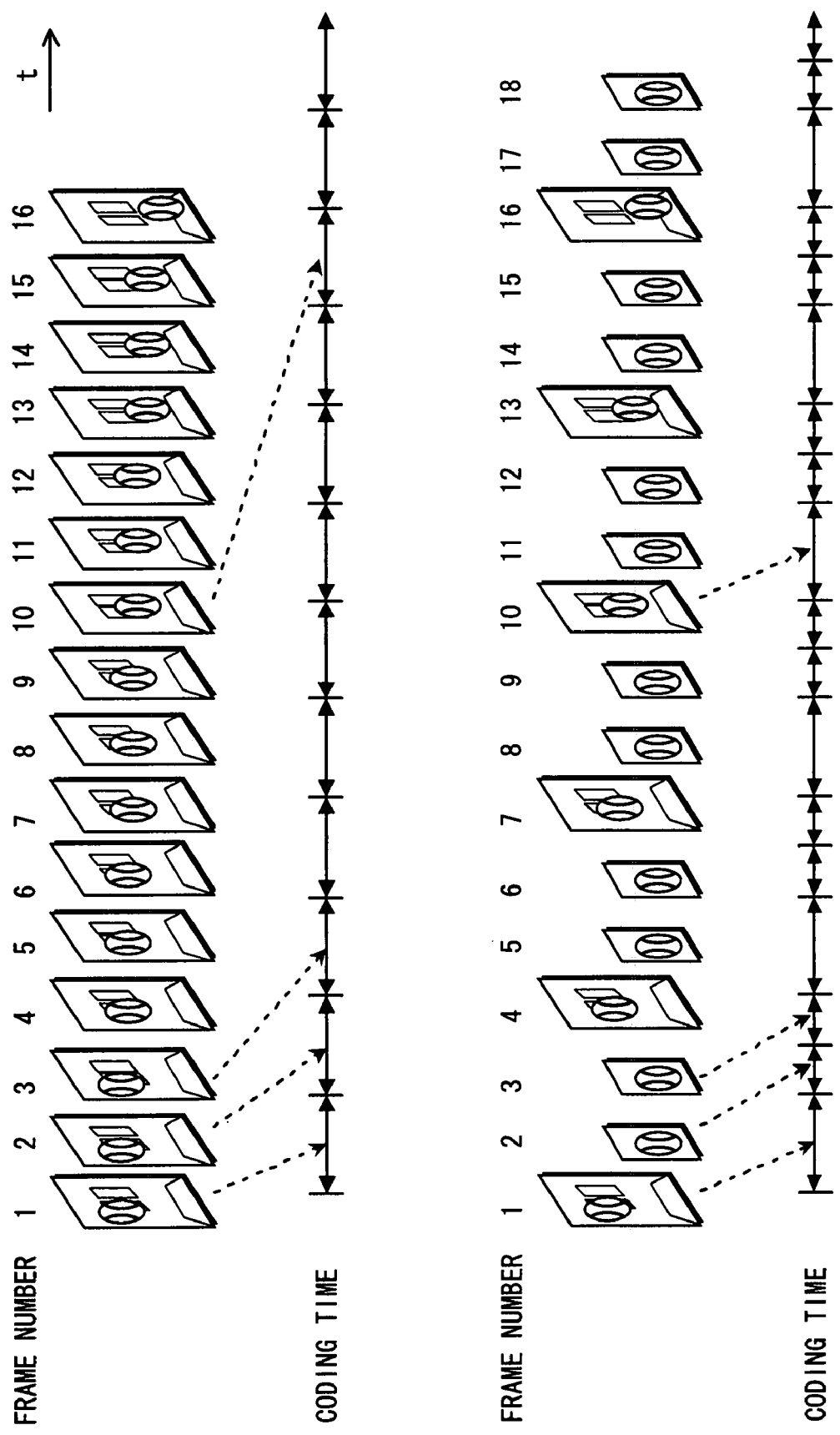
FIG. 9 shows a coding time according to the first embodiments.

FIG. 9 shows a time required for the coding process according to this embodiment.

An upper tier shows a coding process rate when a coding device having a coding capacity of 60 fps processes whole frames at 180 fps. A lower tier shows a coding process rate when the coding device processes a mixture of whole frames and partial frames at 180 fps.

According to this embodiment, it is possible to achieve a same level of processing performance as when coding processing performance of about 1.5 times is realized.

Therefore, for example in a case where a photographing frame rate that exceeds a coding rate is set, photography can be performed at the photographing frame rate by designating a specific part.

<Operation>

The following describes an operation of the moving image recording/playback device 1000.

Two processes that are a process of recording a moving image and a process of playing a moving image are described below.

<Process of Recording a Moving Image>

Figure 10:
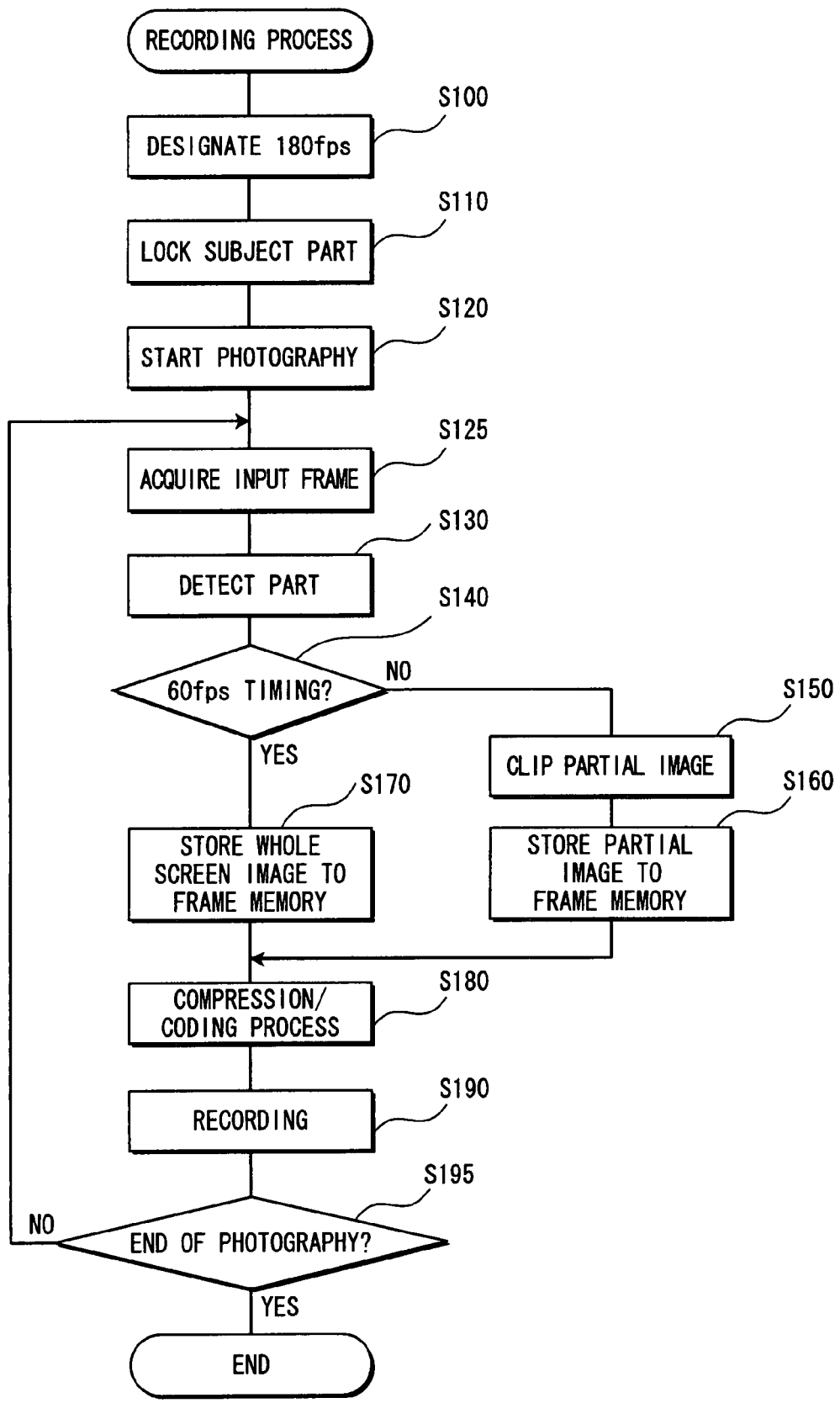
FIG. 10 is a flowchart showing a moving image recording process performed by the moving image recording/playback device according to the first embodiment.

The process of recording a moving image is described first, with reference to FIG. 10.

FIG. 10 is a flowchart showing the moving image recording process by the moving image recording/playback device 1000.

The user designates to photograph at 180 fps (step S100), and locks a specific part which he/she wants to photograph chiefly (step S110).

For example, the user selects a photographing frame rate from a menu or the like, has a specific part shown within a predetermined rectangle in a viewfinder of a liquid crystal display, and presses a lock button.

The subject locking unit 1200 recognizes the specific part within the rectangle, extracts edge information of the specific part, and stores the extracted edge information to the template information storage unit 1210 as specific part template information.

After storing the specific part template information to the template information storage unit 1210, the subject locking unit 1200 notifies the user of the registration of the specific part by, for example, displaying a message indicating the completion of the locking.

The user then starts photography by pressing a start button or the like (step S120).

The start of the photography is notified to the recording control unit 1700 via a user interface unit (not illustrated) and the like. Having been notified of the start of the photography, the recording control unit 1700 instructs each functional unit to start photography, and begins timing at 180 fps.

When the timing of 180 fps coincides with the timing of 60 fps, the recording control unit 1700 notifies the recording frame generation unit 1400 that the timing of 180 fps coincides with the timing of 60 fps. Otherwise, the recording control unit 1700 notifies the recording frame generation unit 1400 that the timing of 180 fps does not coincide with the timing of 60 fps.

Upon receiving the instruction to start photography, the camera unit 1110 converts reflected light of a subject to an electric signal at the set imaging frame rate of 180 fps, and sends the electric signal to the image input unit 1100.

The image input unit 1100 receives the electric signal, applies various signal processing to the electric signal to generate an input frame, and sends the input frame to the specific part position detection unit 1300 and the recording frame generation unit 1400 (step S125).

The specific part position detection unit 1300 receives the input frame, searches the input frame for a position of the specific part based on the specific part template information stored in the template information storage unit 1210, and sends the detected position to the recording frame generation unit 1400 as specific part position information (step S130).

The specific part position detection unit 1300 also sends the specific part within the searched input frame, to the subject locking unit 1200. The subject locking unit 1200 updates the specific part template information stored in the template information storage unit 1210, based on the received specific part.

The recording frame generation unit 1400 receives the specific part position information. When notified of the timing of 60 fps from the recording control unit 1700 (step S140: YES), the recording frame generation unit 1400 sends the input frame received from the image input unit 1100 to the image compression unit 1500 as a whole frame.

The image compression unit 1500 receives the whole frame, and stores the whole frame to the frame memory 1600 (step S170).

When notified of the timing other than 60 fps from the recording control unit 1700 (step S140: NO), on the other hand, the recording frame generation unit 1400 passes the input frame and the specific part position information received from the specific part position detection unit 1300 to the specific part clipping unit 1410, and has the specific part clipping unit 1410 generate a partial frame (step S150).

The recording frame generation unit 1400 sends the partial frame generated by the specific part clipping unit 1410, to the image compression unit 1500.

The image compression unit 1500 receives the partial frame, and stores the partial frame to the frame memory 1600 (step S160).

After storing a recording frame, i.e. the whole frame or the partial frame, to the frame memory 1600, the image compression unit 1500 codes the recording frame (step S180), and records a coding result onto the recording medium 3000 (step S190).

The moving image recording process of steps S125 to S190 is performed until an instruction to end the photography is issued (step S195: NO). When the photography end instruction is issued (step S195: YES), the process ends.

<Process of Playing a Moving Image>

Figure 11:
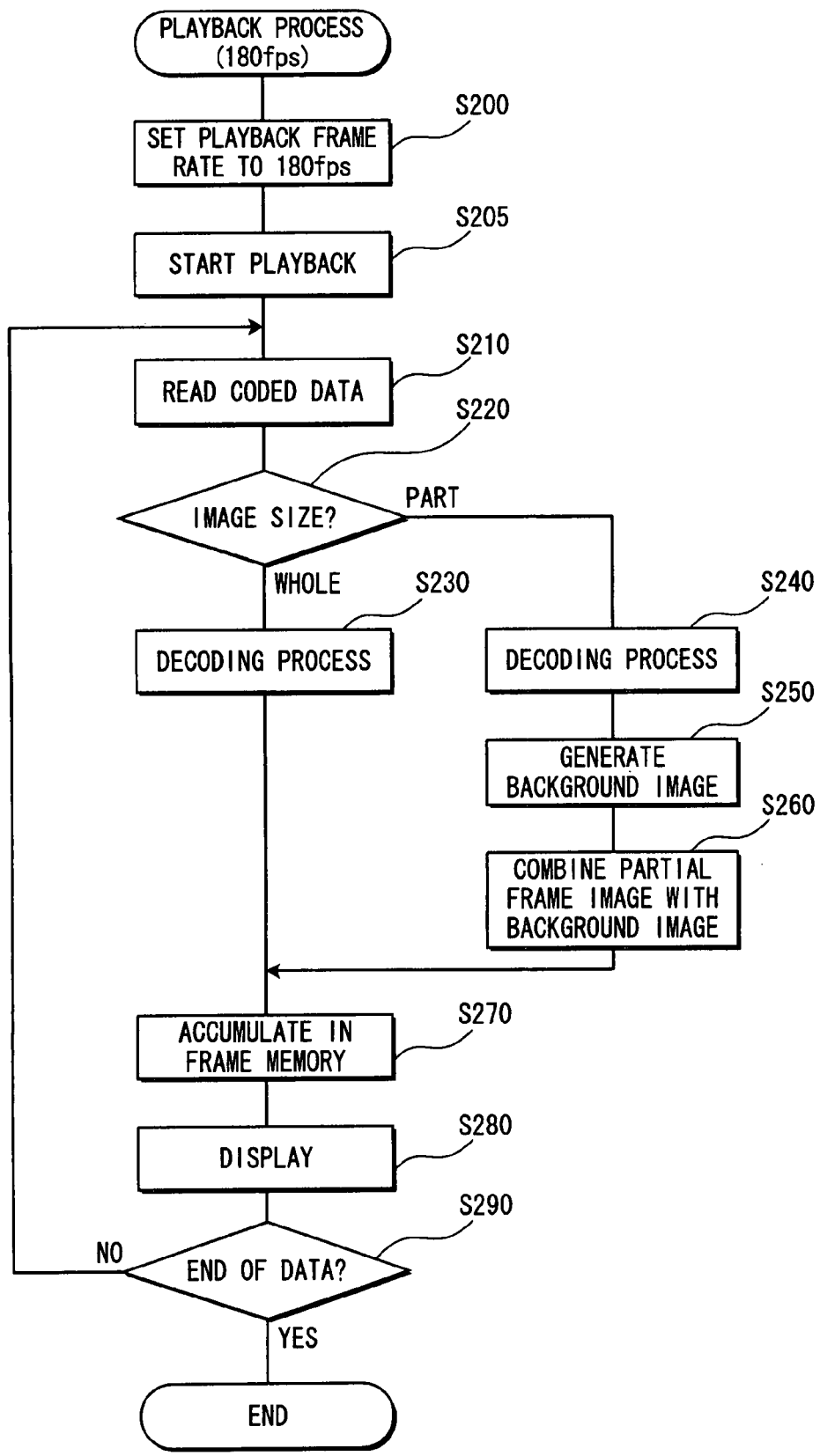
FIG. 11 is a flowchart showing a moving image playback process at a frame rate of 180 fps.
Figure 12:
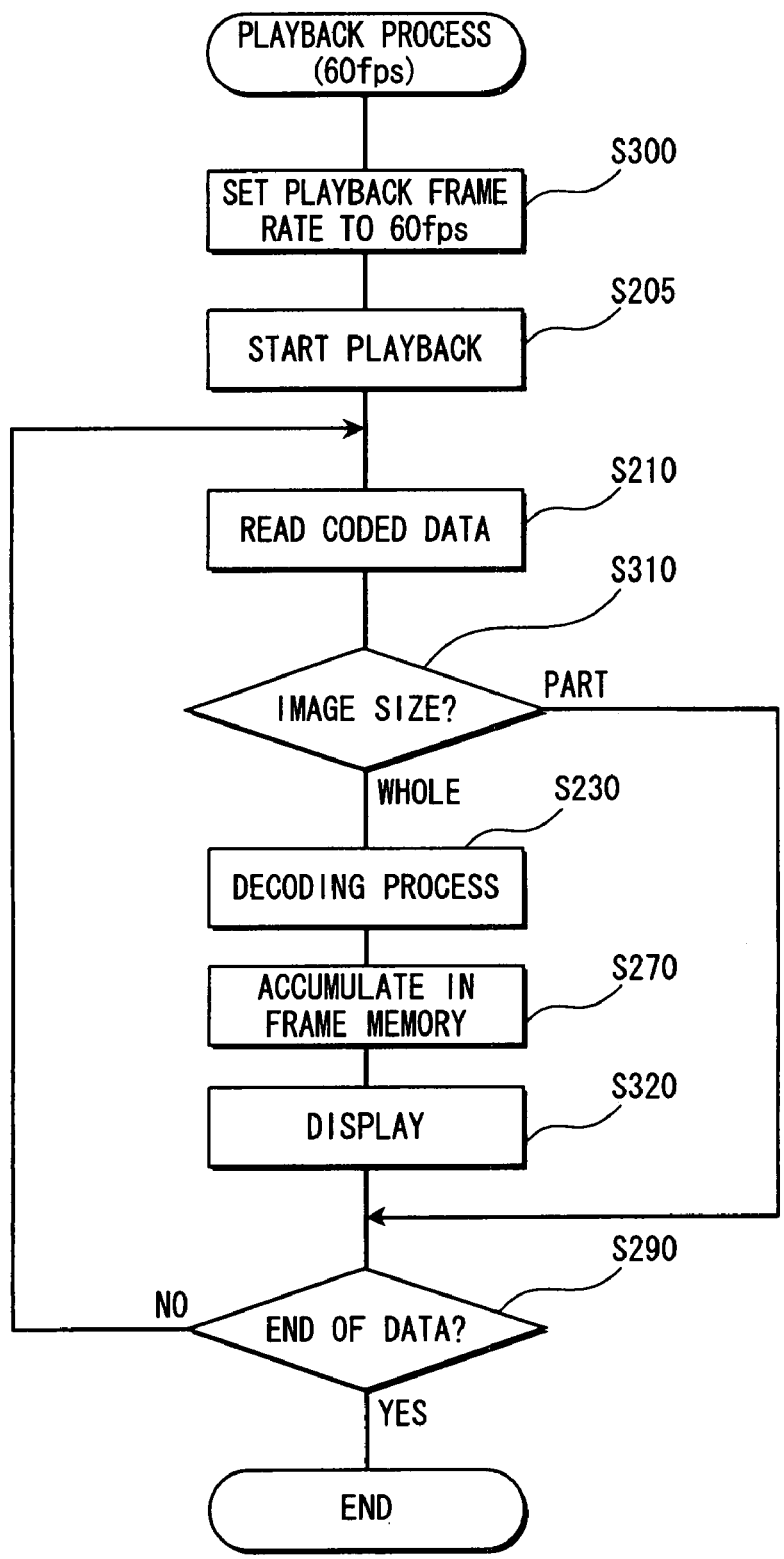
FIG. 12 is a flowchart showing a moving image playback process at a frame rate of 60 fps.

The following describes the process of playing a moving image, with reference to FIGS. 11 and 12.

The moving image recording/playback device 1000 is capable of playing a moving image, which was photographed at the frame rate of 180 fps, either at 180 fps or at 60 fps by skipping frames. A playback process at 180 fps and a playback process at 60 fps are described below by referencing FIGS. 11 and 12, respectively.

FIG. 11 is a flowchart showing the process of playing a moving image at the frame rate of 180 fps.

The user designates to play at 180 fps (step S200), and starts playback by pressing a play button or the like (step S205).

The start of the playback is notified to the playback control unit 2600 via a user interface unit (not illustrated) and the like. Having been notified of the start of the playback, the playback control unit 2600 instructs each functional unit to start playback. It is assumed here that the playback frame rate designated by the user is stored in the playback frame storage unit 2300 by a user interface.

Upon receiving the playback start instruction, the image decompression unit 2400 reads data of coded recording frames from the recording medium 3000 in sequence (step S210).

The image decompression unit 2400 judges whether the read data is data of a whole frame or data of a partial frame (step S220). In detail, the image decompression unit 2400 references the size information 121 in the access unit 100 (see FIG. 7), and judges that the read data is data of a whole frame if the size information 121 is "0", and data of a partial frame if the size information 121 is "1".

When the image size is the whole frame size (step S220: WHOLE), the image decompression unit 2400 performs the decoding process corresponding to the whole frame size (step S230), and stores a decoding result to the frame memory 2500 (step S270).

When the image size is the partial frame size (step S220: PART), the image decompression unit 2400 performs the decoding process corresponding to the partial frame size (step S240), temporarily stores the decoded partial frame to the frame memory 2500, and also passes the decoded partial frame to the display frame generation unit 2200. When doing so, the image decompression unit 2400 passes the image size 122 and the position 123 of the access unit 100 (see FIG. 7) to the display frame generation unit 2200, too.

Having received the decoded partial frame, the display frame generation unit 2200 instructs the background image generation unit 2220 to generate a background image of the partial frame.

Upon receiving the instruction, the background image generation unit 2220 reads whole frames preceding and succeeding the partial frame from the frame memory 2500, and generates the background image (step S250).

Next, the display frame generation unit 2200 instructs the combination unit 2210 to combine the background image generated by the background image generation unit 2220 with an image of the partial frame, to generate a display frame.

Upon receiving the instruction, the combination unit 2210 combines the background image and the partial frame to generate the display frame, with reference to the image size 122 and the position 123 received from the image decompression unit 2400 (step S260).

The display frame generation unit 2200 stores the display frame generated by the combination unit 2210, to the frame memory 2500 (step S270).

The image display unit 2100 displays the display frame stored in the frame memory 2500, at the playback frame rate (step S280).

The moving image playback process of steps S210 to S280 is performed until an instruction to end the playback is issued or there is no more coded moving image data (step S290: NO). When the playback end instruction is issued or the coded moving image data ends (step S290: YES), the process ends.

The process of playing at 60 fps is described next.

FIG. 12 is a flowchart showing the process of playing a moving image at the frame rate of 60 fps.

The following only describes differences from when playing at the frame rate of 180 fps.

The differences lie in that: the user designates to play at 60 fps (step S300); the display is performed at the frame rate of 60 fps (step S320); and, in the case of a partial frame (step S310: PART), the decoding process of the partial frame is not performed and so the display frame generation is not performed either. That is to say, the partial frame is skipped. The other steps are the same as those in FIG. 11.

In more detail, the image decompression unit 2400 judges whether the read image data is data of a whole frame or data of a partial frame (step S310). When the image size is the whole frame size (step S310: WHOLE), the image decompression unit 2400 performs the decoding process corresponding to the whole frame size (step S230) and stores a decoding result to the frame memory 2500 (step S270).

When the image size is the partial frame size (step S310: PART), on the other hand, the image decompression unit 2400 does not perform any process, and reads next coded frame data (step S210).

First Modification Example

While the first embodiment records whole frames and partial frames together, a first modification example of the first embodiment records whole frames and partial frames separately.

Figure 13:
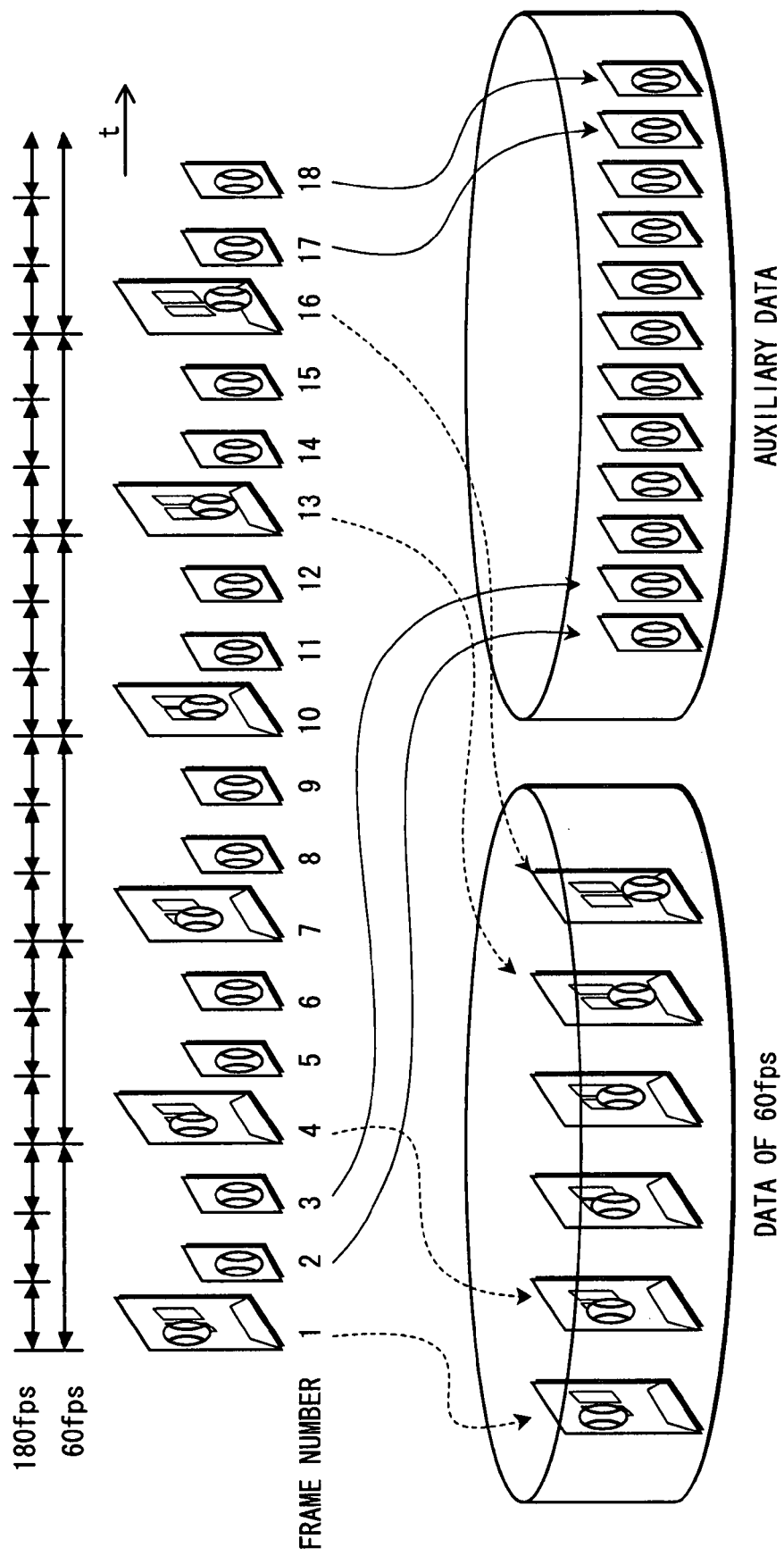
FIG. 13 shows a concept of a first modification example that separately records whole frames and partial frames.

FIG. 13 is a conceptual view of the first modification example that records whole frames and partial frames separately.

According to this recording method, there is an advantage that a file which stores only whole frames, i.e., image frames of the frame rate of 60 fps, can be played by a general playback device other than that of the present invention.

The following describes a method of playing data that has been recorded with whole frames and partial frames being separated from each other, at 180 fps in the moving image recording/playback device 1000.

It is assumed here that the data of the whole frames of 60 fps has information indicating the existence of auxiliary data, in the SEI 120 (see FIG. 7) of each access unit 100.

In this modification example, picture timing SEI included in the SEI 120 of each access unit 100 is utilized.

Every access unit includes picture timing SEI. This picture timing SEI includes a difference from a decoding time of an IDR (Instantaneous Decoder Refresh) picture and a difference between a decoding time and a presentation time, and enables a display timing from an IDR picture to be determined.

Here, an IDR picture is image data that serves as a separator in a data stream, and its presence indicates that succeeding image data can be decoded correctly without using preceding data.

Accordingly, the display can be performed in a correct order by using the above display timing and the information indicating the existence of auxiliary data of the whole frames in this modification example.

In detail, in the case of playback at 180 fps, frames with a display timing of every 1/180 second from a display timing of an IDR picture are detected in the data of the whole frames of 60 fps and the auxiliary data, and the detected frames are submitted for display.

Even when the auxiliary data is present in only one part of the data stream, there is an advantage that this part of the data stream can be submitted for high-speed playback, slow playback, and the like by using the auxiliary data.

Second Modification Example

While the first embodiment record's a partial frame as an image of 1280×720 (pixels) (see FIG. 3), a second modification example of the first embodiment records a partial frame as an image of 1920×1080 (pixels) that is the same size as a whole frame.

Figure 14:
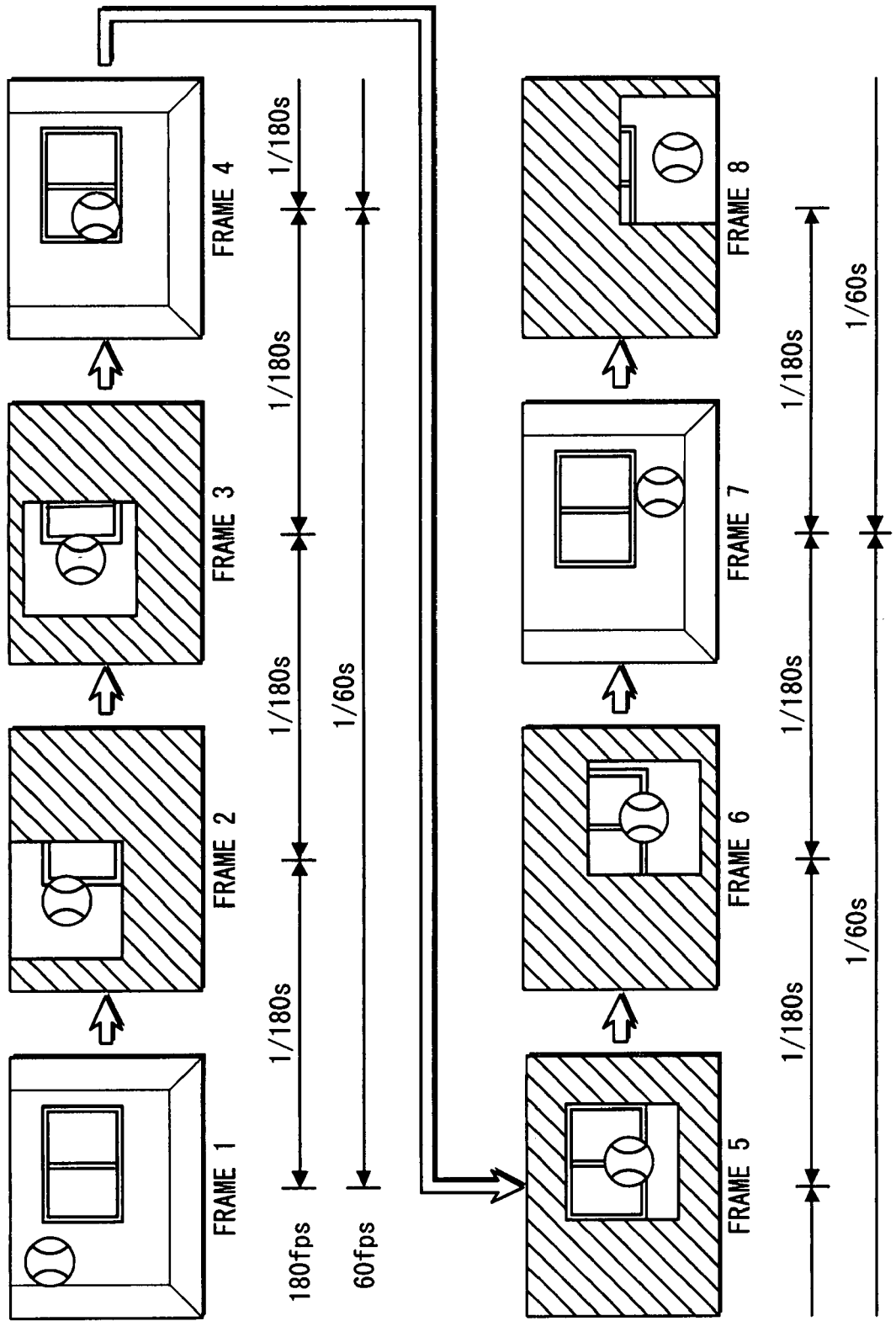
FIG. 14 shows image frames recorded according to a second modification example.

FIG. 14 shows image frames recorded in the second modification example.

In FIG. 14, a diagonally shaded part of an image frame is a part that is filled with one predetermined color.

A frame that is recorded as a partial frame in the first embodiment, e.g. frame 2 and frame 3, is recorded as a whole frame that is filled with one color except a part corresponding to the partial frame.

According to this recording method, the following advantages can be achieved when compared with conventional techniques.

Firstly, since a change in image frames is small, an amount of data as a result of compression coding can be reduced, and also a load of the coding process can be lessened.

Furthermore, the playback can be performed even by a general playback device.

In this modification example, for instance, the recording frame generation unit 1400 clips a specific part and generates a whole frame that is filled with one color except the specific part.

Second Embodiment

Overview

The first embodiment describes the case where a moving image is photographed using one camera. In a second embodiment of the present invention, on the other hand, a moving image is photographed using two cameras, for recording the same image data as in the first embodiment.
<Structure>

Figure 15:
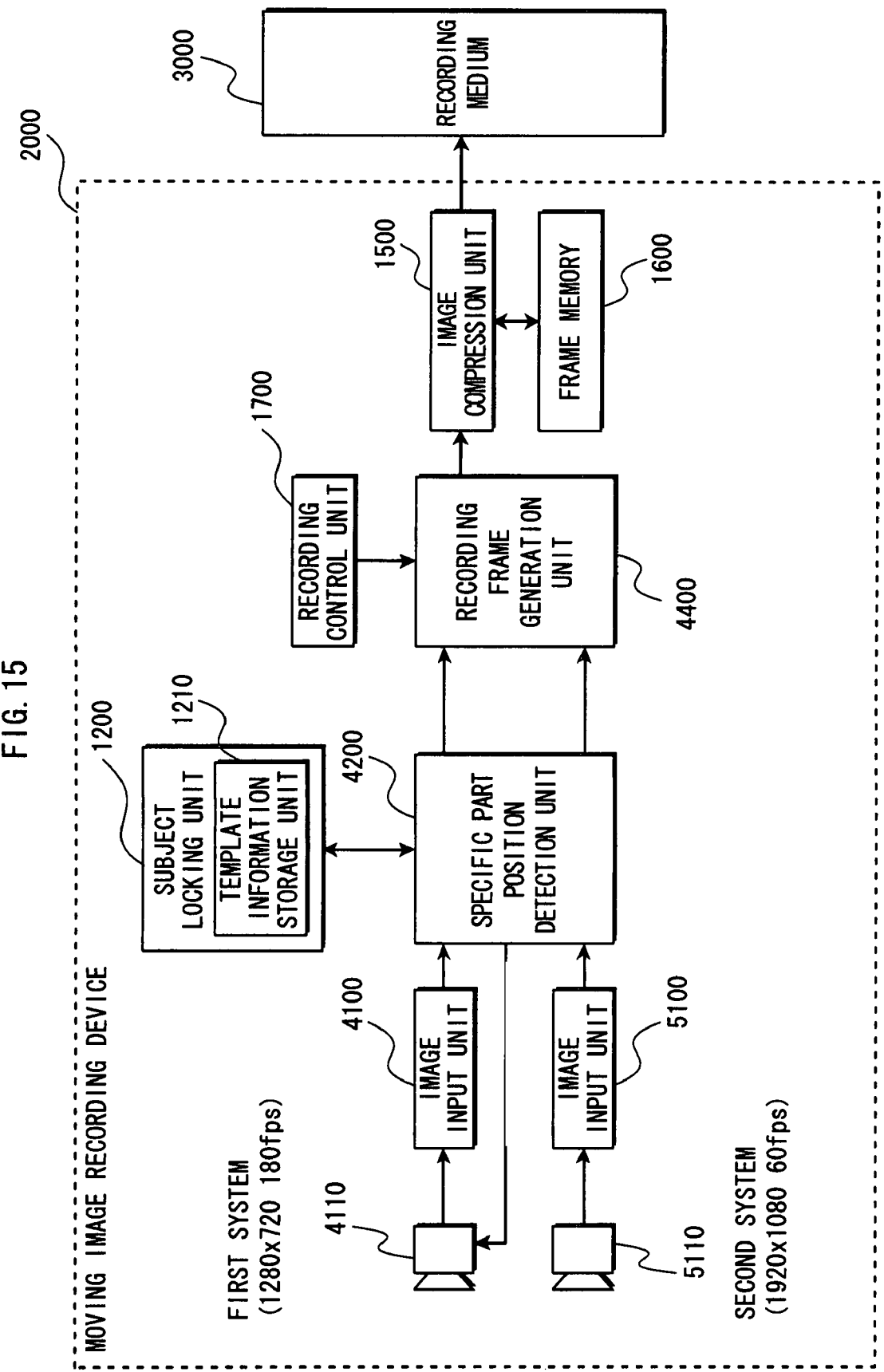
FIG. 15 is a functional block diagram showing a structure of a moving image recording device according to a second embodiment of the present invention.
Figure 16:
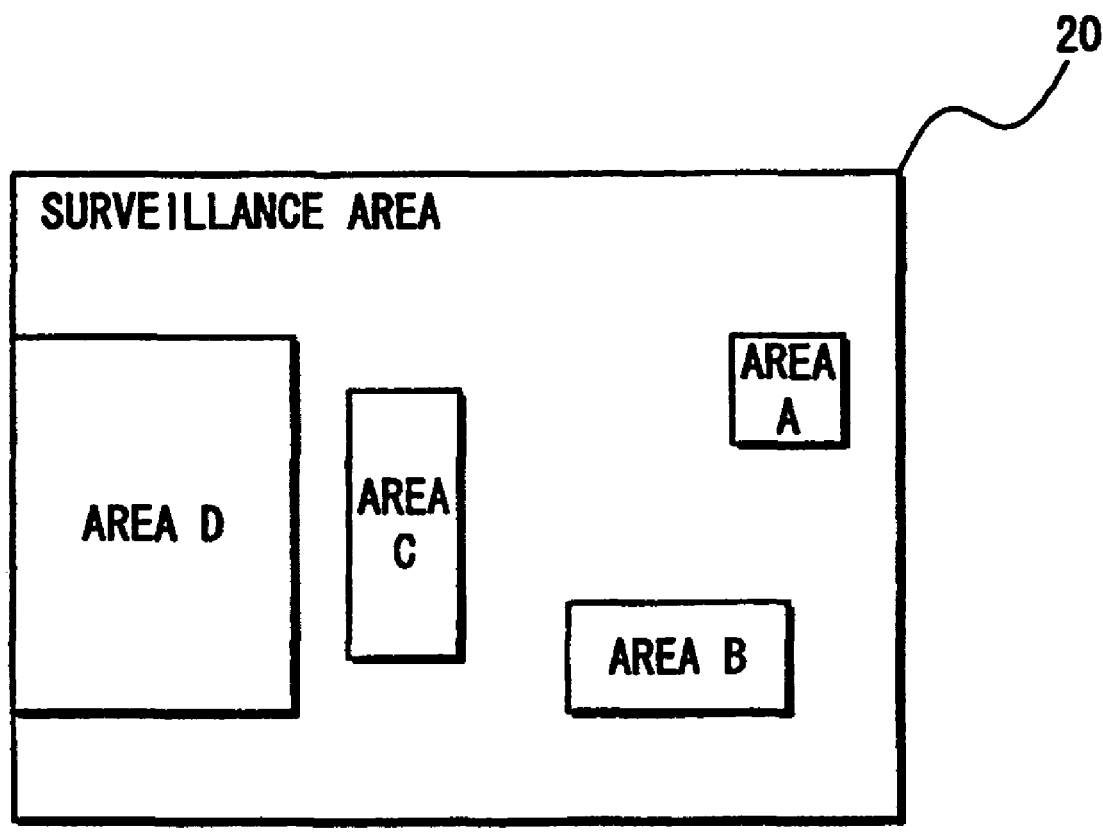
FIG. 16 shows an example of a photographing screen according to a conventional technique.

FIG. 15 is a functional block diagram showing a structure of a moving image recording device according to the second embodiment of the present invention.

A moving image recording device 2000 according to this embodiment includes cameras 4110 and 5110, image input units 4100 and 5100, a specific part position detection unit 4200, a recording frame generation unit 4400, the subject locking unit 1200, the recording control unit 1700, the image compression unit 1500, and the frame memory 1600.

The subject locking unit 1200, the recording control unit 1700, the image compression unit 1500, and the frame memory 1600 have the same functions as those in the first embodiment.

Also, the cameras 4110 and 5110, the image input units 4100 and 5100, the specific part position detection unit 4200, and the recording frame generation unit 4400 basically have similar functions to the camera 1110, the image input unit 1100, the specific part position detection unit 1300, and the recording frame generation unit 1400 of the first embodiment, but differ in the following points.

The moving image recording device 2000 is provided with two camera systems. A first camera system includes the camera 4110 for photographing at a high speed and a low resolution, whilst a second camera system includes the camera 5110 for photographing at a low speed and a high resolution.

In more detail, the camera of the first system photographs an image of 1280×720 (pixels) that is the same size as a partial frame, at the frame rate of 180 fps. The camera of the second system photographs an image of 1920×1080 (pixels) that is the same seize as a whole frame, at the frame rate of 60 fps.

The first system records while zooming in a specific part, whereas the second system records an entire movement of a subject.

That is, the high-speed, low-resolution camera 4110 of the first system photographs, in detail, one part of an image that is photographed by the low-speed, high-resolution camera 5110 of the second system.

In other words, a whole frame and a partial frame described in the first embodiment are photographed by the second system and the first system, respectively.

The image input unit (4100, 5100) converts a signal received from the corresponding camera unit (4110, 5110) to a digital signal, applies various signal processing to the digital signal to generate an image frame of a corresponding number of pixels, and outputs the image frame to the specific part position detection unit 4200.

Hereafter, an image frame output from the image input unit 4100 of the first system is called a "partial frame", and an image frame output from the image input unit 5100 of the second system is called a "whole frame".

The specific part position detection unit 4200 detects a position of an image of a partial frame in an image of a whole frame.

The specific part position detection unit 4200 sends position information indicating a result of the detection, to the recording frame generation unit 4400. Also, the specific part position detection unit 4200 feeds back the position information to a camera control actuator (not illustrated) of the camera unit 4110, to control the camera unit 4110 to change a position of an image photographed by the camera.

The specific part position detection unit 4200 outputs the partial frame to the recording frame generation unit 4400 together with the detected position information.

The recording frame generation unit 4400 outputs either a whole frame or a partial frame to the image compression unit 1500, in accordance with an instruction from the recording control unit 1700.

According to this embodiment, a process such as clipping a specific part described in the first embodiment is unnecessary.

As a result, the same effects as the moving image recording/playback device of the first embodiment can be easily achieved even with a device that is not provided with a high-resolution, high-speed sensor.

Also, by connecting the two camera systems as in this embodiment, not only the process of clipping a partial frame becomes unnecessary, but also the realizability can be increased in cases such as where photography is performed at a higher speed and where a sensor sensitivity cannot be attained.

Although the present invention has been described by way of the above embodiments, it should be obvious that the present invention is not limited to the above. For example, the following modifications are possible.

(1) The above embodiments describe the case where the whole frame size is 1920×1080 (pixels) and the partial frame size is 1280×720 (pixels), but this is not a limit for the present invention.

Also, the above embodiments describe the case where the partial frame size is fixed, but the partial frame size may be variable. For example, the partial frame size may be changed as the specific part changes.

(2) The above embodiments describe an example of generating the template by edge detection, as the means for recognizing the specific part of the subject. However, the present invention is not limited to this method, as any function of recognizing the subject is equally applicable.

(3) The above embodiments describe the case of using the frame rates of 180 fps and 60 fps, but the present invention is equally applicable to other frame rates.

Also, the above embodiments describe the case where both a frame to be decoded and a frame rate of displaying are specified by specifying a playback frame rate. However, not limited to this, a frame to be decoded and a frame rate of displaying may be specified separately.

More specifically, the above embodiments describe the case where a moving image is photographed at the frame rate 180 fps, and all the frames of the moving image are decoded and displayed at the frame rate 180 fps (see FIG. 11), and the case where a moving image is photographed at the frame rate 180 fps, and the frames of the moving image are decoded by skipping and displayed at the frame rate 60 fps (see FIG. 12). However, not limited to these cases, all the frames of a moving image photographed at the frame rate 180 fps may be decoded and displayed at the frame rate 60 fps (namely, a slow playback), or may be decoded and displayed at the frame rate 240 fps (namely, a high speed display).

In these cases, the playback frame rate storage unit 2300 stores (i) decoding frame information specifying a frame to be decoded and (ii) a display frame rate specifying a frame rate of displaying. The playback control unit 2600 notifies the decoding frame information to the image decompression unit 2400, and the image display unit 2100 displays the display frames at the display frame rate.

Also, the above embodiments describe the case where whole frames and partial frames are recorded regularly, but they may instead be recorded randomly. For example, by recording a whole frame only when a background has changed to at least a predetermined extent, an amount of data can be reduced while dealing with a change in background.

(4) The above embodiments describe the case where a background image of a partial frame is generated from whole frames preceding and succeeding the partial frame. As an alternative, the background image may be generated only from the preceding whole frame. In such a case, only one frame of data needs to be read.

(5) The moving image recording/playback device may be realized by implementing part or all of the structural elements shown in FIG. 1 in an integrated circuit of one chip or multiple chips. Examples are shown in FIG. 1 as integrated circuits 9000 and 9100.

(6) The moving image recording/playback device may be realized by implementing part or all of the structural elements shown in FIG. 1 by a computer program, or in any other form.

In the case of a computer program, the computer program written on any recording medium such as a memory card or a CD-ROM may be read and executed by a computer. Alternatively, the computer program may be downloaded via a network and executed by a computer.

<Details of the Conventional Technique>

Figure 17:
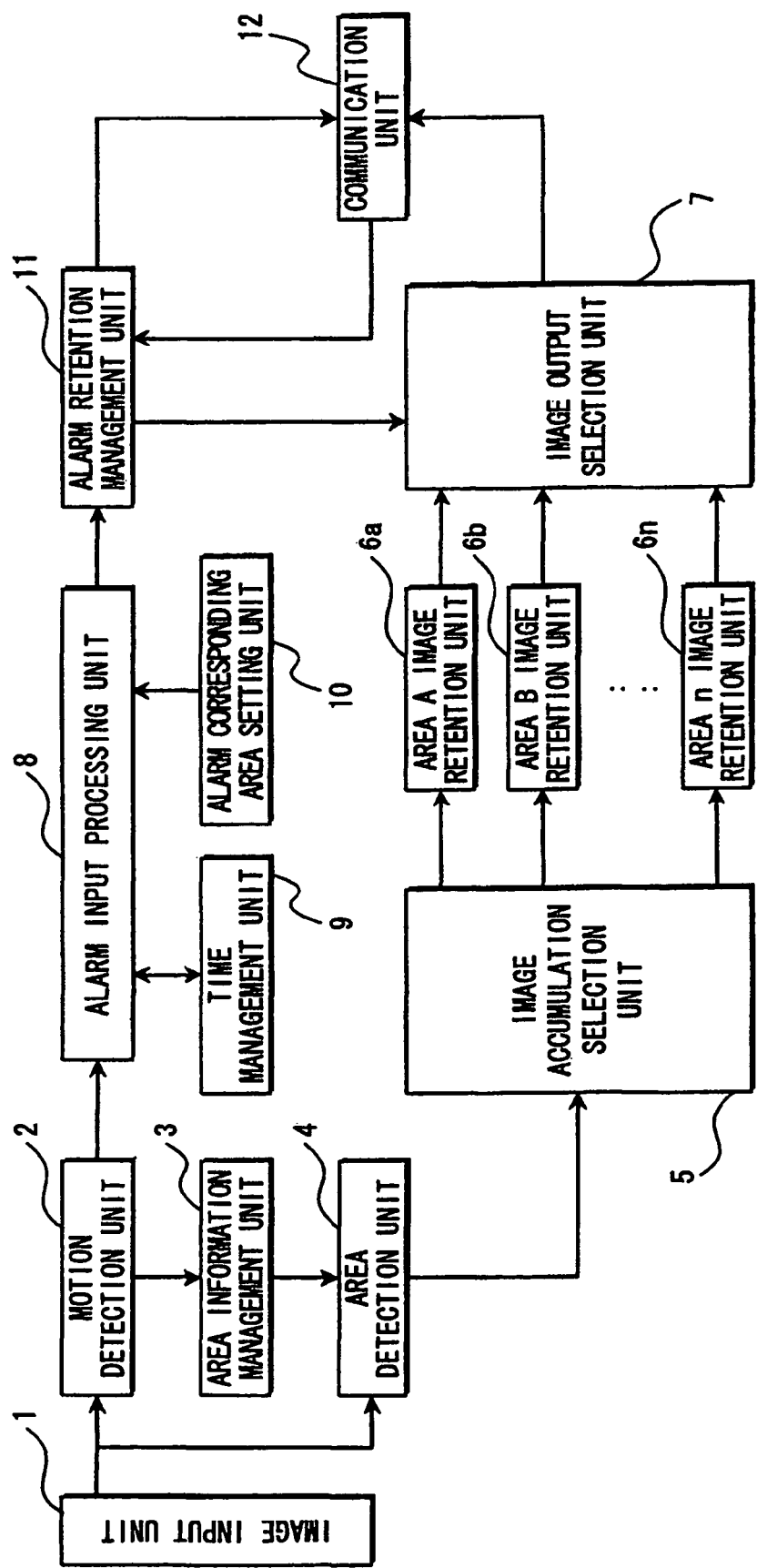
FIG. 17 shows a structure of a conventional surveillance camera.

The following describes the conventional technique with reference to FIG. 17.

When detecting a movement in any predetermined area based on an image photographed by an image input unit 1, a motion detection unit 2 outputs an alarm corresponding to the area to an area information management unit 3 and an alarm input processing unit 8.

The area information management unit 3 outputs coordinate position information of the area corresponding to the input alarm, to an area detection unit 4 together with identification information of the area.

The area detection unit 4 clips the area of the coordinate position information from the image input from the image input unit 1 based on the input coordinate position information, and outputs the clipped area to an image accumulation selection unit 5 together with the identification information of the area.

The image accumulation selection unit 5 accumulates the input image information in an image retention unit (6a to 6n) corresponding to the area.

Meanwhile, having received the alarm, the alarm input processing unit 8 collects information of the area corresponding to the alarm and a time, from a time management unit 9 and an alarm corresponding area setting unit 10, and retains the collected information in an alarm retention management unit 11.

The alarm information retained in the alarm retention management unit 11 and the image in the image retention unit (6a to 6n) selected by an image output selection unit 7 are sent to a monitor terminal connected by a network or the like, via a communication unit 12.

According to this conventional technique, in the case of high-speed photography or high-speed continuous photography having a high frame rate (a large number of frames photographed per second), when only reduced-size images or clipped images are accumulated to reduce a storage amount of a frame memory, only the clipped images can be played, causing a loss of information.

Also, in the case where high-speed photography is performed using a digital camera or a movie camera, when the user wants to view a moving image normally (30 fps, 60 fps) or wants to thin out photographs, he/she can only view clipped images.

A high-speed frame image generation device according to the present invention is useful as it enables a low-cost and high-resolution image to be photographed at a high speed in a video camera, a digital camera, and a high-speed photography camera. The high-speed frame image generation device according to the present invention is useful for any camera system.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A moving image recording device that records a moving image of a subject, the moving image recording device comprising:
    an imaging unit that sequentially outputs a plurality of image frames that constitute the moving image, at a predetermined frame rate;
    a storage unit that stores therein specific part template information used for detecting a specific part of the subject;
    a calculating unit, for each of partial image frames, that detects the specific part of the subject with use of the specific part template information stored in the storage unit, and calculates specific part position information used for specifying a position of the detected specific part, the partial image frames being image frames included in the plurality of image frames output from the imagining unit other than image frames at intervals of a predetermined number of frames;
    a clipping unit that clips out, of each partial image frame, a partial area including the specific part of the subject with use of the specific part position information calculated by the calculating unit; and
    a recording unit, for the plurality of image frames output from the imaging unit, that records whole image frames at intervals of a predetermined number of frames, and the partial image frames with the clipped partial area between the whole image frames, onto a recording medium.

2. The moving image recording device of claim 1, further comprising:
    a coding unit that codes image frames,
    wherein in a case of recording the partial image frames, the coding unit codes an image frame which is output from the imaging unit and filled with one predetermined color except a part to be recorded, and the recording unit records the coded image frame.

3. The moving image recording device of claim 1, further comprising:
    a generation unit that generates display frames to be displayed, from image frames recorded on the recording medium,
    wherein the generation unit sequentially reads a plurality of image frames that are composed of the recorded whole image frames and the recorded partial images frames from the recording medium, and generates a plurality of display frames from the read plurality of image frames, and
    when reading the plurality of recorded images frames, the generation unit generates a display frame from the recorded partial image frames and the recorded whole image frames.

4. The moving image recording device of claim 3,
    wherein the recording unit records the partial image frames onto the recording medium in correspondence with information showing a position of the clipped partial area, and
    when reading the recorded partial image frames, the generation unit generates a display frame in which the clipped partial area is reflected at the position shown by the information.

5. The moving image recording device of claim 3,
    wherein the generation unit further sequentially reads only the recorded whole image frames from the recording medium and generates display frames from the recorded whole image frames.

6. A moving image playback device that plays a photographed image recorded on a recording medium, the photographed image being composed of a plurality of image frames that are photographed at a predetermined frame rate and are made up of a first group of image frames and a second group of image frames, each of the image frames of the first group representing a partial area clipped out of the plurality of image frames as partial image frames, the partial area being previously identified as a specific part of the plurality of images frames based on specific part position information, and the second group representing whole image frames, the moving image playback device comprising:
    a reading unit that reads image frames of the photographed image from the recording medium; and
    a generation unit that generates display frames from the image frames read by the reading unit,
    wherein the reading unit sequentially reads image frames from the recording medium and the generation unit generates the display frames from the read image frames, and
    when a read image frame is an image frame of the first group, the generation unit generates a display frame that includes an image frame of the first group and an image frame of the second group, and
    wherein each image frame recorded on the recording medium has time stamp information showing a display timing, and the first group of image frames and the second group of image frames are recorded in separate consecutive areas, and
    in a case of performing playback, the reading unit sequentially reads the image frames and the generation unit generates the display frames from the read image frames, based on the time stamp information.

7. The moving image playback device of claim 6,
wherein the reading unit sequentially reads only the image frames of the second group and the generation unit generates a display frame from the read image frames of the second group.

8. A moving image playback device that plays a photographed image recorded on a recording medium, the photographed image being composed of a plurality of image frames that are photographed at a predetermined frame rate and are made up of a first group of image frames and a second group of image frames, each of the image frames of the first group representing a partial area clipped out of the plurality of image frames as partial image frames, the partial area being previously identified as a specific part of the plurality of images frames based on specific part position information, and the second group representing whole image frames, the moving image playback device comprising:
  a reading unit that reads image frames of the photographed image from the recording medium; and
  a generation unit that generates display frames from the image frames read by the reading unit,
  wherein the reading unit sequentially reads image frames from the recording medium and the generation unit generates the display frames from the read image frames, and
  when a read image frame is an image frame of the first group, the generation unit generates a display frame that includes an image frame of the first group and an image frame of the second group, and
  wherein each image frame recorded on the recording medium has time stamp information showing a display timing, and the first group of image frames and the second group of image frames are recorded on separate recording media, and
  in a case of performing playback, the reading unit sequentially reads the image frames and the generation unit generates the display frames from the read image frames, based on the time stamp information.

9. The moving image playback device of claim 8,
wherein the reading unit sequentially reads only the image frames of the second group and the generation unit generates a display frame from the read image frames of the second group.

10. A moving image recording method used in a moving image recording device that records a moving image of a subject, the moving image recording method comprising:
  an imaging step of sequentially outputting a plurality of image frames that constitute the moving image, at a predetermined frame rate;
  a storing step of storing, using a storage unit, specific part template information used for detecting a specific part of the subject;
  a calculating step of detecting, using a calculating unit and for each of partial image frames, the specific part of the subject with use of the specific part template information stored in the storage unit, and calculating specific part position information used for specifying a position of the detected specific part, the partial image frames being image frames included in the plurality of image frames output from the imagining unit other than image frames at intervals of a predetermined number of frames;
  a clipping step of clipping out, using a clipping unit, each partial image frame, a partial area including the specific part of the subject with use of the specific part position information calculated by the calculating unit; and
  a recording step of, for the plurality of image frames output in the imaging step, recording whole image frames at intervals of a predetermined number of frames and the partial image frames with the clipped partial area between the whole image frames onto a recording medium.

11. An integrated circuit of a moving image recording device that records a moving image of a subject, the integrated circuit comprising:
  an imaging unit that sequentially outputs a plurality of image frames that constitute the moving image, at a predetermined frame rate;
  a storage unit that stores therein specific part template information used for detecting a specific part of the subject;
  a calculating unit, for each of partial image frames, that detects the specific part of the subject with use of the specific part template information stored in the storage unit, and calculates specific part position information used for specifying a position of the detected specific part, the partial image frames being image frames included in the plurality of image frames output from the imagining unit other than image frames at intervals of a predetermined number of frames;
  a clipping unit that clips out, of each partial image frame, a partial area including the specific part of the subject with use of the specific part position information calculated by the calculating unit; and
  a recording unit, for the plurality of image frames output from the imaging unit, that records whole image frames at intervals of a predetermined number of frames and the partial image frames with the clipped partial area between the whole image frames, onto a recording medium.

12. The integrated circuit of claim 11, further comprising:
  a generation unit that generates display frames to be displayed, from image frames recorded on the recording medium,
  wherein in a case of performing display, the generation unit sequentially reads a plurality of image frames that are composed of the recorded whole image frames and the partial image frames, and generates a plurality of display frames from the read plurality of image frames, and
  when reading the recorded plurality of image frames, the generation unit generates a display frame from the recorded partial image frames and the recorded whole image frames.

13. An integrated circuit of a moving image playback device that plays a photographed image recorded on a recording medium, the photographed image being composed of a plurality of image frames that are photographed at a predetermined frame rate and are made up of a first group of image frames and a second group of image frames, each of the image frames of the first group representing a partial area clipped out of the plurality of image frames as partial images frames, the partial area being previously identified as a specific part of the plurality of images frames based on specific part position information, and the second group of images frames representing whole image frames, the integrated circuit comprising:
  a reading unit that reads image frames of the photographed image from the recording medium; and
  a generation unit that generates display frames from the image frames read by the reading unit,
  wherein the reading unit sequentially reads image frames from the recording medium and the generation unit generates the display frames from the read image frames, and when a read image frame is an image frame of the first group, the generation unit generates a display frame from an image frame of the first group and an image frame of the second group, and wherein each image frame recorded on the recording medium has time stamp information showing a display timing, and the first group of image frames and the second group of image frames are recorded in separate consecutive areas, and in a case of performing playback, the reading unit sequentially reads the image frames and the generation unit generates the display frames from the read image frames, based on the time stamp information.

14. An integrated circuit of a moving image playback device that plays a photographed image recorded on a recording medium, the photographed image being composed of a plurality of image frames that are photographed at a predetermined frame rate and are made up of a first group of image frames and a second group of image frames, each of the image frames of the first group representing a partial area clipped out of the plurality of image frames as partial images frames, the partial area being previously identified as a specific part of the plurality of images frames based on specific part position information, and the second group of images frames representing whole image frames, the integrated circuit comprising:

a reading unit that reads image frames of the photographed image from the recording medium; and a generation unit that generates display frames from the image frames read by the reading unit, wherein the reading unit sequentially reads image frames from the recording medium and the generation unit generates the display frames from the read image frames, and when a read image frame is an image frame of the first group, the generation unit generates a display frame from an image frame of the first group and an image frame of the second group, and wherein each image frame recorded on the recording medium has time stamp information showing a display timing, and the first group of image frames and the second group of image frames are recorded on separate recording media, and in a case of performing playback, the reading unit sequentially reads the image frames and the generation unit generates the display frames from the read image frames, based on the time stamp information.

\* \* \* \* \*